(12) United States Patent
Michael et al.

(10) Patent No.: US 10,367,921 B2
(45) Date of Patent: Jul. 30, 2019

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventors: Lachlan Bruce Michael, Saitama (JP); Kazuyuki Takahashi, Chiba (JP)

(73) Assignee: SONY CORPORATION, Tokyo (JP)

( * ) Notice: Subject to any disclaimer, the term of this patent is extended or adjusted under 35 U.S.C. 154(b) by 41 days.

(21) Appl. No.: 15/520,918

(22) PCT Filed: Oct. 19, 2015

(86) PCT No.: PCT/JP2015/079442
§ 371 (c)(1),
(2) Date: Apr. 21, 2017

(87) PCT Pub. No.: WO2016/067954
PCT Pub. Date: May 6, 2016

(65) Prior Publication Data
US 2018/0027096 A1 Jan. 25, 2018

(30) Foreign Application Priority Data
Oct. 30, 2014 (JP) .................. 2014-222026

(51) Int. Cl.
H04L 29/06 (2006.01)
H04L 29/08 (2006.01)
H04N 21/6332 (2011.01)

(52) U.S. Cl.
CPC ............ *H04L 69/04* (2013.01); *H04L 69/161* (2013.01); *H04L 69/324* (2013.01); *H04N 21/6332* (2013.01)

(58) Field of Classification Search
CPC ...................................................... H04L 69/04
(Continued)

(56) References Cited

U.S. PATENT DOCUMENTS

2004/0107298 A1* 6/2004 Westphal ................ H04L 29/06
709/247
2009/0034528 A1 2/2009 Park
(Continued)

FOREIGN PATENT DOCUMENTS

EP 1 916 819 A1 4/2008
JP 2009-130678 A 6/2009
JP 2010-130473 A 6/2010

OTHER PUBLICATIONS

International Search Report dated Dec. 15, 2015, in PCT/JP2015/079442, filed Oct. 19, 2015.
(Continued)

Primary Examiner — Peter G Solinsky
(74) Attorney, Agent, or Firm — Oblon, McClelland, Maier & Neustadt, L.L.P.

(57) ABSTRACT

The present technology relates to a transmission apparatus, a transmission method, a reception apparatus, and a reception method that efficiently broadcast IP packets to ensure a quick process. A transmission packet including the IP packet is transmitted and received. A header in the transmission packet is constituted of type information and length information. The type information expresses whether an IP header and a UDP header are compressed. The length information expresses a length of the transmission packet to transmit the IP packet including a UDP packet. A payload in the transmission packet is constituted of a destination IP address and a destination port number or a destination index made correspond to the destination IP address and the destination port number and a payload in the UDP packet. The present technology is, for example, applicable to the broadcast of the IP packets.

17 Claims, 19 Drawing Sheets

(58) Field of Classification Search
USPC ........................................................ 370/474
See application file for complete search history.

(56) References Cited

U.S. PATENT DOCUMENTS

| | | | | |
|---|---|---|---|---|
| 2011/0090889 A1* | 4/2011 | Yamada | ............ | H04L 29/12028 |
| | | | | 370/338 |
| 2012/0155375 A1* | 6/2012 | Zhu | ........................ | H04B 7/155 |
| | | | | 370/315 |
| 2013/0010800 A1* | 1/2013 | Ilan | ........................ | H04L 1/0084 |
| | | | | 370/400 |
| 2015/0124699 A1* | 5/2015 | Chebolu | ............... | H04W 28/06 |
| | | | | 370/328 |
| 2015/0146729 A1* | 5/2015 | Babu | ........................ | H04L 69/22 |
| | | | | 370/392 |
| 2015/0257037 A1* | 9/2015 | Chebolu | ............. | H04L 65/1089 |
| | | | | 370/329 |
| 2017/0134763 A1* | 5/2017 | Hwang | ................ | H04N 21/234 |

OTHER PUBLICATIONS

Association of Radio Industries and Businesses, "ARIB STD-B32 3.0 Edition", Jul. 31, 2014, 459 pages, with partial English translation.
Extended European Search Report dated Oct. 25, 2018 in Patent Application No. 15854706.7, 9 pages.
Casner, S. et al. "Compressing IP/UDP/RTP Headers for Low-Speed Serial Links" Network Working Group, XP002121319, 1999, 22 pages.

* cited by examiner

FIG. 4

IPv4 Header Format

| Offsets | Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|---|
| | | | 0 | | | | | | | | 1 | | | | | | | | 2 | | | | | | | | | | | | 3 | | | |
| 0 | 0 | | Version | | | | IHL | | | | DSCP | | | | | | ECN | | Total Length | | | | | | | | | | | | | | | |
| 4 | 32 | | Identification | | | | | | | | | | | | | | | | Flags | | | Fragment Offset | | | | | | | | | | | | |
| 8 | 64 | | Time To Live | | | | | | | | Protocol | | | | | | | | Header Checksum | | | | | | | | | | | | | | | |
| 12 | 96 | | Source IP Address | | | | | | | | | | | | | | | | | | | | | | | | | | | | | | | |
| 16 | 128 | | Destination IP Address | | | | | | | | | | | | | | | | | | | | | | | | | | | | | | | |
| 20 | 160 | | Options(if IHL>5) | | | | | | | | | | | | | | | | | | | | | | | | | | | | | | | |

FIG. 5

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source port ||||||||||||||||| Destination port |||||||||||||||||
| 4 | 32 | Length ||||||||||||||||| Checksum |||||||||||||||||

UDP Header

FIG. 6

| Type value |
|---|
| 000 : Padding |
| 001 : Signaling |
| 010 : IPv4 |
| 011 : IPv4(Compressed Header) |
| 100 : TS |
| 101 : Reserved |
| 110 : Reserved |
| 111 : Reserved |

FIG. 8

| DESTINATION INDEX | TRANSMISSION SOURCE IP ADDRESS | DESTINATION IP ADDRESS | TRANSMISSION SOURCE PORT NUMBER | DESTINATION PORT NUMBER | REMARKS |
|---|---|---|---|---|---|
| 0x00 | 192.168.0.0 | 224.0.0.1 | 60000 | 123 | NTPv4 |
| 0x01 | 192.168.0.0 | 224.0.23.60 | 60000 | 4937 | Service Signaling channel |
| 0x02 | 192.168.0.0 | 224.0.0.2 | 60000 | 60001 | |
| 0x03 | 192.168.0.0 | 224.0.0.2 | 60000 | 60002 | |
| ... | ... | ... | ... | ... | |
| 0x10 | 192.168.0.0 | 224.0.0.2 | 60000 | 60015 | |
| 0x11 | 192.168.0.0 | 224.0.0.3 | 60000 | 60001 | |
| 0x12 | 192.168.0.0 | 224.0.0.3 | 60000 | 60002 | |
| ... | ... | ... | ... | ... | |
| 0xfc | 192.168.0.0 | 224.0.0.17 | 60000 | 600011 | |
| 0xfd | 192.168.0.0 | 224.0.0.17 | 60000 | 600012 | |
| 0xfe | 192.168.0.0 | 224.0.0.17 | 60000 | 600013 | |
| 0xff | 192.168.0.0 | 224.0.0.17 | 60000 | 600014 | |

FIG. 9

| HEADER COMPRESSION METHOD | HEADER LENGTH | EFFECT OF COMPRESSION |
|---|---|---|
| Super compressed mode | 1B | 27B |
| Compressed mode with IP and UDP address | 6B | 22B |
| Non compressed mode | 28B | 0 |

FIG. 17

```
Version: 4
IHL: 5
DSCP: 0
ECN: 0
Identification: 0
Flags: 0
Fragment Offset : 0
Time To Live: 128
Protocol: 17
```

TRANSMISSION APPARATUS, TRANSMISSION METHOD, RECEPTION APPARATUS, AND RECEPTION METHOD

TECHNICAL FIELD

The present technology relates to a transmission apparatus, a transmission method, a reception apparatus, and a reception method. The present technology especially relates to a transmission apparatus, a transmission method, a reception apparatus, and a reception method that, for example, efficiently broadcast IP packets to ensure a quick process.

BACKGROUND ART

For example, an Advanced Television Systems Committee (ATSC) 3.0, one of next-generation terrestrial broadcasting standards, determines use of not Transport Stream (TS) packets but UDP/IP, that is, IP packets including UDP packets, for data transmission. The use of the IP packets also in a broadcast system other than ATSC 3.0 is expected in the future.

By the way, the IP packet includes various pieces of information in a header, and this causes a large overhead. Therefore, as a technique to compress the header in the IP packet for effective transmission of the IP packet, there has been provided a Robust Header Compression (RoHC) specified by an Internet Engineering Task Force (IETF).

In the RoHC, the IP packet including all information in the header (hereinafter also referred to as a complete IP packet) is transmitted. Regarding a header in the subsequent IP packet, information different from that in the header in the previous complete IP packet is transmitted.

Like the RoHC, the compression technique of the header in the IP packet that transmits the complete IP packet and then transmits the IP packet with the header including the information different from that in the header in the complete IP packet is hereinafter also referred to as a differential compression method.

For example, in an advanced broadcast satellite (BS), the differential compression method has been specified as a technique to compress the header in the IP packet (Non-Patent Document 1).

CITATION LIST

Patent Document

Non-Patent Document 1:"ARIBSTD-B32 3.0 Edition," Association of Radio Industries and Businesses

SUMMARY OF THE INVENTION

Problems to be Solved by the Invention

Use of the differential compression method in broadcasting such as ATSC 3.0 possibly fails to broadcast the IP packets effectively.

That is, after a receiving side receives the complete IP packets, the differential compression method can restore the subsequent IP packets. Accordingly, the complete IP packets need to be frequently broadcasted to some extent to restore the IP packets on the receiving side. This makes it difficult to expect a substantial effect of the compression.

Furthermore, after the receiving side starts receiving the IP packets, the IP packets that the receiving side has received before the first reception of the complete IP packet cannot be restored. The IP packet process becomes possible after the complete IP packet is received first.

Accordingly, it is possibly difficult for the receiving side to quickly process the IP packets in the differential compression method.

The present technology has been made considering such circumstances to efficiently broadcast IP packets and ensure a quick process.

Solutions to Problems

A first transmission apparatus according to the present technology includes: a creation unit configured to create a transmission packet, the transmission packet being constituted of: a header constituted of type information and length information, the type information expressing whether an Internet Protocol (IP) header and a User Datagram Protocol (UDP) header are compressed, the length information expressing a length of the transmission packet to transmit an IP packet including a UDP packet; and a payload constituted of a destination index and a payload in the UDP packet, the destination index being made correspond to a destination IP address of the IP packet and a destination port number of the UDP packet; and a transmission unit configured to transmit the transmission packet.

A first transmission method according to the present technology includes steps of: creating a transmission packet, the transmission packet being constituted of: a header constituted of type information and length information, the type information expressing whether an Internet Protocol (IP) header and a User Datagram Protocol (UDP) header are compressed, the length information expressing a length of the transmission packet to transmit an IP packet including a UDP packet; and a payload constituted of a destination index and a payload in the UDP packet, the destination index being made correspond to a destination IP address of the IP packet and a destination port number of the UDP packet; and transmitting the transmission packet.

In the first transmission apparatus and transmission method according to the present technology, a transmission packet is created and transmitted. The transmission packet is constituted of a header and a payload. The header is constituted of type information and length information. The type information expresses whether an Internet Protocol (IP) header and a User Datagram Protocol (UDP) header are compressed. The length information expresses a length of the transmission packet to transmit an IP packet including a UDP packet. The payload is constituted of a destination index and a payload in the UDP packet. The destination index is made correspond to a destination IP address of the IP packet and a destination port number of the UDP packet.

A first reception apparatus according to the present technology includes: a reception unit configured to receive a transmission packet, the transmission packet being constituted of: a header constituted of type information and length information, the type information expressing whether an Internet Protocol (IP) header and a User Datagram Protocol (UDP) header are compressed, the length information expressing a length of the transmission packet to transmit an IP packet including a UDP packet; and a payload constituted of a destination index and a payload in the UDP packet, the destination index being made correspond to a destination IP address of the IP packet and a destination port number of the UDP packet; and a restoration unit configured to restore the IP packet from the transmission packet.

A first reception method according to the present technology includes steps of: receiving a transmission packet, the transmission packet being constituted of: a header constituted of type information and length information, the type information expressing whether an Internet Protocol (IP) header and a User Datagram Protocol (UDP) header are compressed, the length information expressing a length of the transmission packet to transmit an IP packet including a UDP packet; and a payload constituted of a destination index and a payload in the UDP packet, the destination index being made correspond to a destination IP address of the IP packet and a destination port number of the UDP packet; and restoring the IP packet from the transmission packet.

In the first reception apparatus and reception method according to the present technology, a transmission packet is received and an IP packet is restored. The transmission packet is constituted of a header and a payload. The header is constituted of type information and length information. The type information expresses whether an Internet Protocol (IP) header and a User Datagram Protocol (UDP) header are compressed. The length information expresses a length of the transmission packet to transmit an IP packet including a UDP packet. The payload is constituted of a destination index and a payload in the UDP packet. The destination index is made correspond to a destination IP address of the IP packet and a destination port number of the UDP packet.

A second transmission apparatus according to the present technology includes: a creation unit configured to create a transmission packet, the transmission packet being constituted of: a header constituted of type information and length information, the type information expressing whether an Internet Protocol (IP) header and a User Datagram Protocol (UDP) header are compressed, the length information expressing a length of the transmission packet to transmit an IP packet including a UDP packet; and a payload constituted of a destination IP address of the IP packet, a destination port number of the UDP packet, and a payload in the UDP packet; and a transmission unit configured to transmit the transmission packet.

A second transmission method according to the present technology includes steps of: creating a transmission packet, the transmission packet being constituted of: a header constituted of type information and length information, the type information expressing whether an Internet Protocol (IP) header and a User Datagram Protocol (UDP) header are compressed, the length information expressing a length of the transmission packet to transmit an IP packet including a UDP packet; and a payload constituted of a destination IP address of the IP packet, a destination port number of the UDP packet, and a payload in the UDP packet; and transmitting the transmission packet.

In the second transmission apparatus and transmission method according to the present technology, a transmission packet is created and transmitted. The transmission packet is constituted of a header and a payload. The header is constituted of type information and length information. The type information expresses whether an Internet Protocol (IP) header and a User Datagram Protocol (UDP) header are compressed. The length information expresses a length of the transmission packet to transmit an IP packet including a UDP packet. The payload is constituted of a destination IP address of the IP packet, a destination port number of the UDP packet, and a payload in the UDP packet.

A second reception apparatus according to the present technology includes: a reception unit configured to receive a transmission packet, the transmission packet being constituted of: a header constituted of type information and length information, the type information expressing whether an Internet Protocol (IP) header and a User Datagram Protocol (UDP) header are compressed, the length information expressing a length of the transmission packet to transmit an IP packet including a UDP packet; and a payload constituted of a destination IP address of the IP packet, a destination port number of the UDP packet, and a payload in the UDP packet; and a restoration unit configured to restore the IP packet from the transmission packet.

A second reception method according to the present technology includes steps of: receiving a transmission packet, the transmission packet being constituted of: a header constituted of type information and length information, the type information expressing whether an Internet Protocol (IP) header and a User Datagram Protocol (UDP) header are compressed, the length information expressing a length of the transmission packet to transmit an IP packet including a UDP packet; and a payload constituted of a destination IP address of the IP packet, a destination port number of the UDP packet, and a payload in the UDP packet; and restoring the IP packet from the transmission packet.

In the second reception apparatus and reception method according to the present technology, a transmission packet is received and an IP packet is restored. The transmission packet is constituted of a header and a payload. The header is constituted of type information and length information. The type information expresses whether an Internet Protocol (IP) header and a User Datagram Protocol (UDP) header are compressed. The length information expresses a length of the transmission packet to transmit an IP packet including a UDP packet. The payload is constituted of a destination IP address of the IP packet, a destination port number of the UDP packet, and a payload in the UDP packet.

Note that, the transmission apparatus and the reception apparatus may be independent apparatuses or may be internal blocks constituting one apparatus.

Effects of the Invention

The present technology efficiently broadcasts IP packets to ensure a quick process.

Note that the effects described here are not necessarily limited and may be any one of the effects described in this disclosure.

BRIEF DESCRIPTION OF DRAWINGS

FIG. 4 is a drawing illustrating a format of an IP header.

FIG. 5 is a drawing illustrating a format of a UDP header.

FIG. 6 is a drawing describing type information (Type) in a Generic header.

FIG. 8 is a drawing illustrating an example of a destination index.

FIG. 9 is a drawing showing lengths of (parts corresponding to) the IP headers and the UDP headers in the IP packets arranged in the respective Generic packets in a super compressed mode, a compressed mode, and anon-compressed mode.

FIG. 17 is a drawing showing items restored to fixed values among IP header items and examples of the fixed values.

MODE FOR CARRYING OUT THE INVENTION

<Examples of Configurations of Broadcast Systems to Which Present Technology Is Applied>

Figure 1:
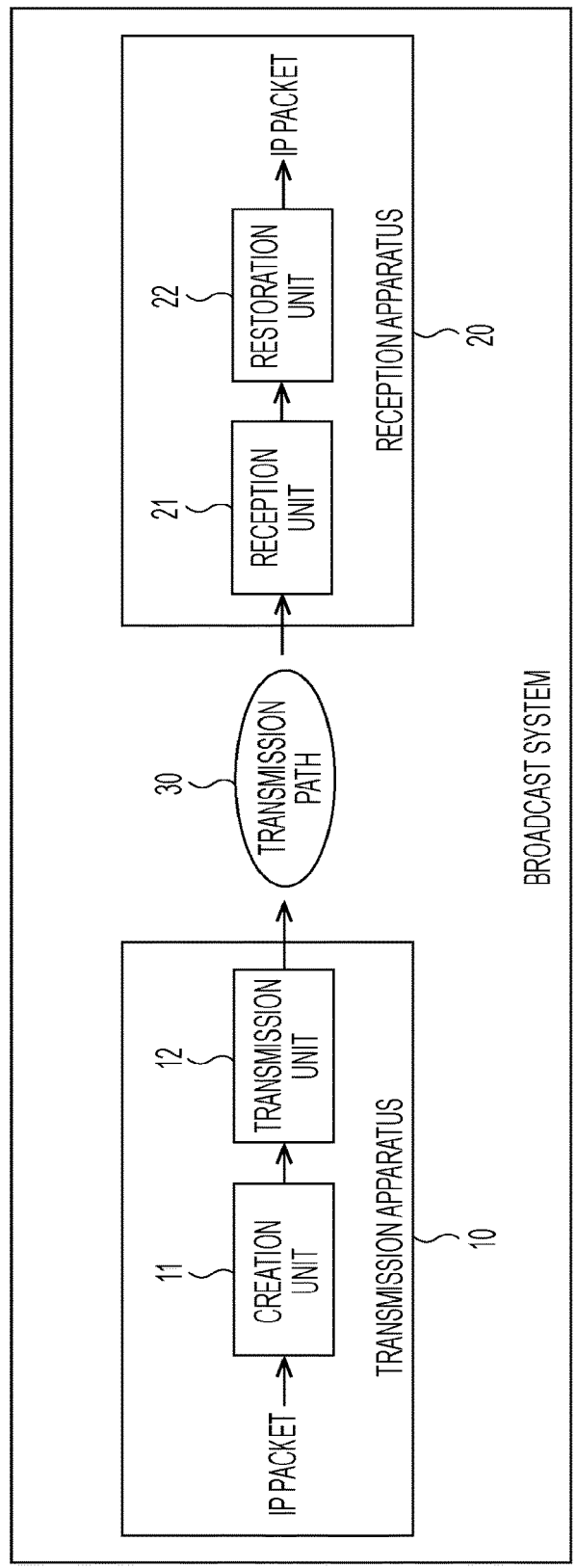
FIG. 1 is a drawing illustrating an example of a configuration according to one embodiment of a broadcast system to which the present technology is applied.

FIG. 1 is a drawing illustrating an example of a configuration according to one embodiment of the broadcast system to which the present technology is applied.

In FIG. 1, the broadcast system is configured of a transmission apparatus 10 and a reception apparatus 20.

The transmission apparatus 10 is, for example, a transmission apparatus compliant with a predetermined broadcast standard such as ATSC 3.0. The transmission apparatus 10 transmits data with IP packets including UDP packets.

That is, the transmission apparatus 10 includes a creation unit 11 and a transmission unit 12.

The IP packet in UDP/IP including actual data target for broadcast, that is, the IP packet in which the UDP packet including actual data is arranged is supplied to the creation unit 11.

The creation unit 11 creates a Generic packet, which will be described later, as a transmission packet to transmit the IP packet supplied to the creation unit 11 and supplies the Generic packet to the transmission unit 12.

The transmission unit 12 transmits the Generic packet supplied from the creation unit 11 via, for example, a transmission path 30, which is a ground wave.

The reception apparatus 20 is, for example, a transmission apparatus compliant with a predetermined broadcast standard such as ATSC 3.0. The reception apparatus 20 receives the IP packet transmitted from the transmission apparatus 10.

That is, the reception apparatus 20 includes a reception unit 21 and a restoration unit 22.

The reception unit 21 receives the Generic packet transmitted from the transmission apparatus 10 via the transmission path 30 and supplies the Generic packet to the restoration unit 22.

The restoration unit 22 restores the IP packet from the Generic packet from the reception unit 21 and outputs the IP packet.

Note that, for ease of explanation, FIG. 1 illustrates the only one reception apparatus 20; however, the plurality of reception apparatuses 20 can be disposed. The plurality of reception apparatuses 20 can simultaneously receive the Generic packets transmitted (broadcasted) by the transmission apparatus 10.

The plurality of transmission apparatuses 10 can also be arranged. The plurality of transmission apparatuses 10 each can transmit the Generic packets at, for example, different frequency bandwidths as different channels. The reception apparatus 20 can select a channel that receives the Generic packets among the respective channels of the plurality of transmission apparatuses 10.

Further, while FIG. 1 employs the ground wave as the transmission path 30, for example, a satellite channel and a cable (wired line) can also be used as the transmission path 30.

<Generic Packet>

Figure 2:
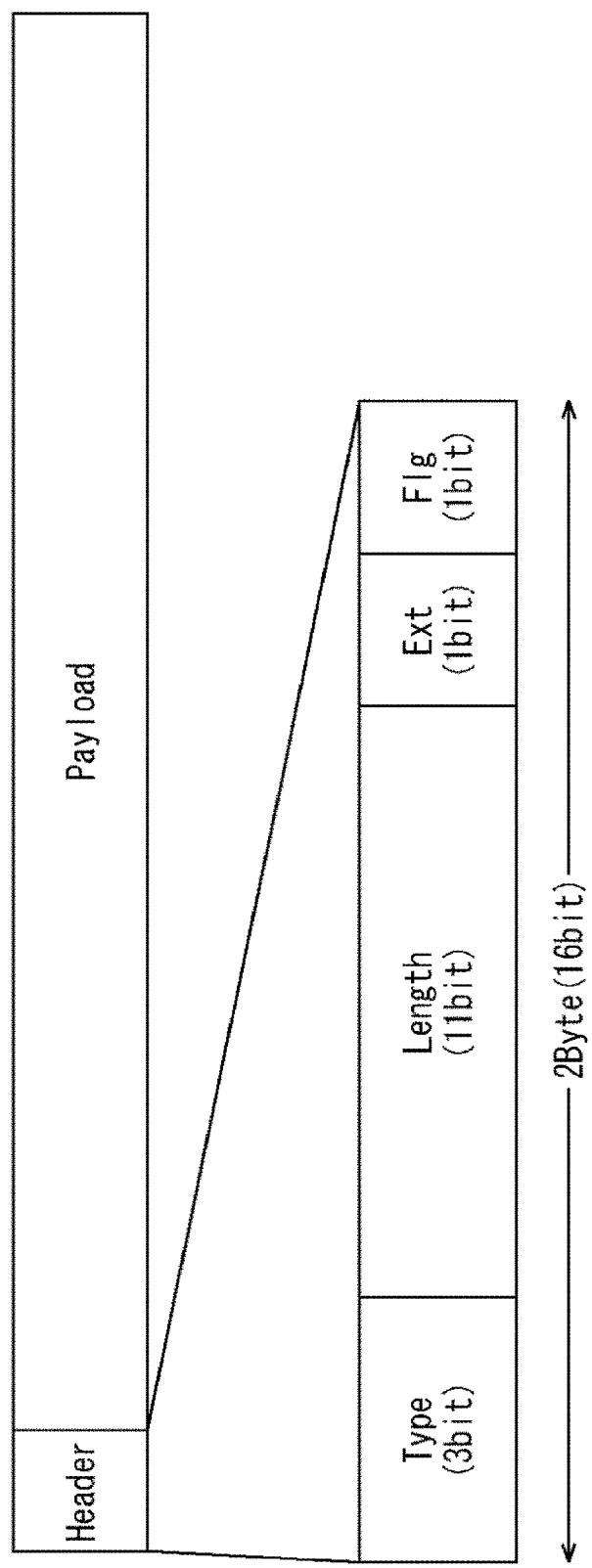
FIG. 2 is a drawing illustrating an example of a format of a Generic packet.

FIG. 2 is a drawing illustrating an example of a format of the Generic packet.

The Generic packet includes a header (Header) and a payload (Payload).

The payload in the Generic packet has a variable length. For example, the IP packet including the UDP packet can be arranged in the payload with the variable length.

The header is configured with a fixed length of, for example, two bytes (16 bits). In the header, for example, three-bit type information (Type), 11-bit length information (Length), one-bit Ext, and one-bit Flg are arranged from the head.

The type information expresses, for example, whether an IP header in the IP packet arranged in the payload and a UDP header in the UDP packet included in the IP packet are compressed. Details of the type information will be described later.

The length information expresses the length of the Generic packet (for example, the number of bytes).

The length expressed by the length information may be the length of the Generic packet itself, that is, the total length of the header and the payload in the Generic packet or may be the length of the payload in the Generic packet. In this embodiment, the length information expresses, for example, the length of the payload in the Generic packet as the length of the Generic packet.

Since the header in the Generic packet has the fixed length, as long as the length of the payload in the Generic packet is found, the length of the Generic packet itself can be uniquely identified.

Here, the following designates the header in the Generic packet also as the Generic header and the payload in the Generic packet also as the Generic payload.

An Ext expresses whether the Generic header is a usual header or an extended header.

Here, the usual header means the two-byte header illustrated in FIG. 2. The extended header means the header constituted with the fixed length of three bytes where one byte is added after the usual header.

As described above, since the length information is 11 bits, the length information can express a value in a range of 0 to 2047 ($=2^{11}-1$) bytes as the length of the Generic payload. However, the 11-bit length information cannot express the length of the Generic payload with 2048 bytes or more.

Therefore, in the case where data with 2047 bytes or less is arranged in the Generic payload, the usual header is used as the Generic header. In the case where the data with 2048 bytes or more is arranged in the Generic payload, the extended header is used as the Generic header.

As described above, the extended header is the header where one byte is added after the usual header. The added one byte can also be referred to as an added byte. The extended header expresses the length information and the length (of the payload) of the Generic packet by a part or all of the added byte.

With the Generic header as the usual header, for example, the Ext is set to 0. With the Generic header as the extended header, for example, the Ext is set to 1.

Note that, when the IP packet is transmitted in an Ethernet (registered trademark) frame, a maximum length of the IP packet that can be arranged in one piece of the Ethernet (registered trademark) frame is restricted to approximately 1500 bytes, which is the maximum length of the Ethernet (registered trademark) frame. In view of this, it is assumed that the IP packet does not exceed 2047 bytes, which can be expressed by the 11-bit length information, so often.

When the IP header in the IP packet arranged in the payload and the UDP header in the UDP packet included in the IP packet are compressed, the Flg serves as kind information expressing a compression kind of the IP header and the UDP header. Details of the kind information will be described later.

Here, the Generic header can be configured without providing one or both of the Ext and the Flg. The configuration of the Generic header without providing the Ext and the Flg allows increasing sizes of the type information and the length information by the amount.

Figure 3:
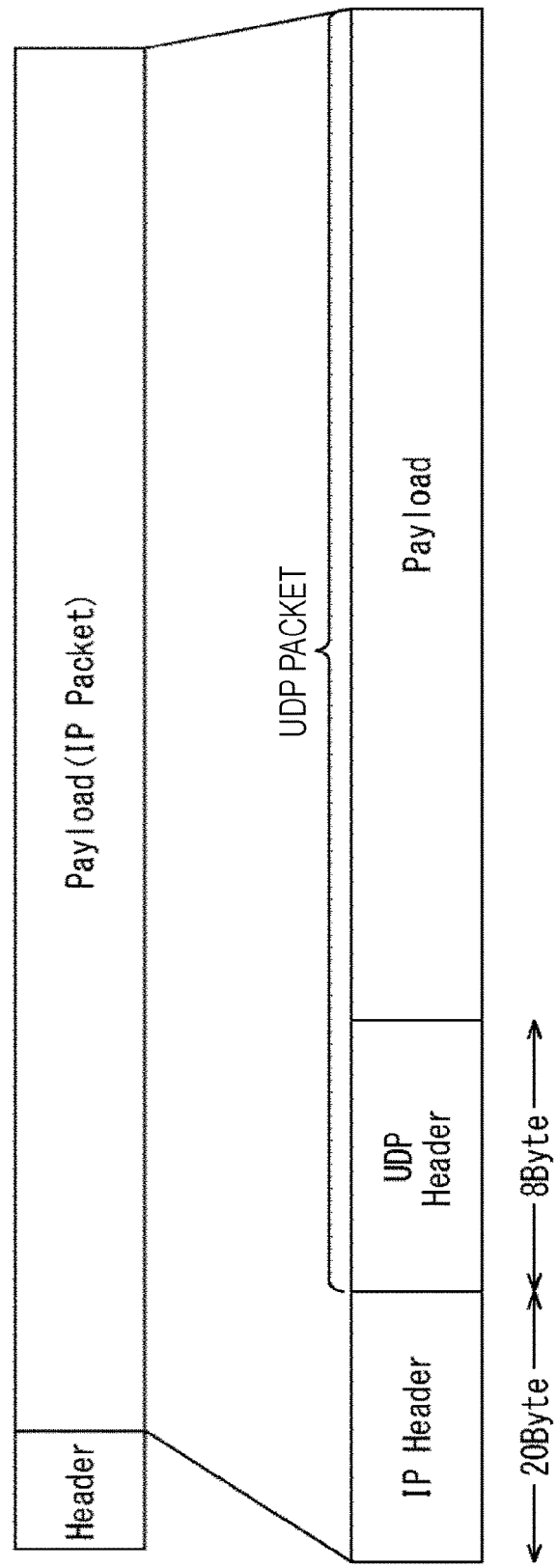
FIG. 3 is a drawing illustrating a format of an IP packet.

FIG. 3 is a drawing illustrating a format of the IP packet including the UDP packet.

The IP packet, for example, includes the 20-byte IP header (IP Header) and the UDP packet arranged in the payload with the variable length.

The UDP packet includes the eight-byte UDP header (UDP Header) and the payload with the variable length. The actual data is arranged in the payload in the UDP packet.

As illustrated in FIG. 3, in the case where the IP packet as described above is arranged in the Generic payload without change, an overhead of total 28 bytes, the 20-byte IP header and the eight-byte UDP header, occurs.

FIG. 4 is a drawing illustrating a format of the IP header in IPv4.

The IP header includes a version (Version), an IHL, a DSCP, an ECN, an IP packet length (Total Length), an Identification, a Flags, a Fragment Offset, a Time To Live, a Protocol, a check sum (Header Checksum), a transmission source IP address (Source IP Address), a destination IP address (Destination IP Address), and a required Options.

Here, since the Options is not generally used, this embodiment does not use the Options.

The version expresses whether the IP version is the IPv4 (IP version4) or IPv6 (IP version6). For ease of explanation, this embodiment assumes the IP version as the IPv4.

The IHL expresses the length of the IP header. A value found by dividing the length of the IP header by 4 is set to the IHL. When the Options is absent in the IP header, the length of the IP header is 20 bytes and therefore 5 (=20/4) is set to the IHL.

The DSCP expresses a priority of the IP packet. The ECN is used for a congestion control of the IP packets.

The IP packet length (Total Length) expresses the total length of the IP packet.

The Identification, Flags, and Fragment Offset are information on a division of the IP packet. Note that it is assumed that the IP packet arranged in the Generic packet is not divided. That is, in the Generic payload, one piece (or more) of the IP packet (s) are arranged without being divided.

The Time to Live (TTL) expresses a survival time of the IP packet, that is, for example, the number of routers in which the IP packets are passable.

The Protocol expresses a protocol included in the payload in the IP packet. In this embodiment, the payload in the IP packet includes the UDP packet. Since the UDP is expressed by 17, 17 is set to the Protocol.

The checksum(Header Checksum) is used to detect an error in the IP header. The checksum for IP is calculated by separating the IP header in units of 16 bits, obtaining a sum of complements of 1 of the respective 16-bit units, and operating the sum of the complements of 1.

An IP address of a transmission source of the IP packet is set to the transmission source IP address (Source IP Address).

An IP address of a destination of the IP packet is set to the destination IP address (Destination IP Address).

To broadcast the IP packets in the Generic packets, essential items required in the reception apparatus 20 to restore the IP header with the format in FIG. 4 (hereinafter also referred to as a proper IP header) among the IP header items in FIG. 4 are the IP packet length (Total Length) and the destination IP address (Destination IP Address).

That is, for the items other than the IP packet length and the destination IP address, which are the essential items for the reception apparatus 20, among the IP header items, the proper IP header free from a problem to be handled by the reception apparatus 20 can be restored by the use of predetermined fixed values and the like.

Note that, in the reception apparatus 20, the transmission source IP address (Source IP Address) among the IP header items other than the IP packet length and the destination IP address can be set to be the fixed values and also obtained from the upper layer protocol.

That is, the transmission apparatus 10, in the upper layer upper than a transport layer as the layer of UDP, transmits the information on the broadcasting station that broadcasts in the broadcast standard such as ATSC 3.0. Therefore, the transmission source IP address can be obtained from the information on the broadcasting station obtained by the upper layer. Note that, as described above, the transmission source IP address may be the fixed value.

FIG. 5 is a drawing illustrating a format of the UDP header.

The UDP header includes a transmission source port number (Source port), a destination port number (Destination port), a UDP packet length (Length), and a checksum (Checksum).

The port number of the transmission source for the UDP packet is set to the transmission source port number (Source port).

The port number of the destination for the UDP packet is set to the destination port number (Destination port).

The UDP packet length (Length) expresses the total length of the UDP packet.

The checksum (Checksum) is used to detect an error in the UDP packet. The checksum for UDP is calculated using an operation of complements of 1 of a UDP pseudo-header, the UDP header, and the payload of the UDP packet. Note that the UDP pseudo-header is virtual data used only to calculate the checksum for UDP.

To broadcast the IP packets including the UDP packets in the Generic packets, the essential items required in the reception apparatus 20 to restore the UDP header with the format in FIG. 5 (hereinafter also referred to as a proper UDP header) among the UDP header items in FIG. 5 are the destination port number (Destination port) and the UDP packet length (Length).

That is, for the items (the transmission source port number and the checksum) other than the destination port number and the UDP packet length, which are the essential items for the reception apparatus 20, among the UDP header items, the proper UDP header free from a problem to be handled by the reception apparatus 20 can be restored by the use of predetermined fixed values and the like.

Note that, in the reception apparatus 20, the transmission source port number (Source port) among the UDP header items other than the UDP packet length and the destination port number can be set to be the fixed values and also obtained from the protocol on the upper layer.

That is, as described in FIG. 4, the transmission apparatus 10, in the upper layer, transmits the information on the broadcasting station that broadcasts in the broadcast standard such as the ATSC 3.0. Therefore, the transmission source port number can be obtained from the information on the broadcasting station obtained by the upper layer. Note that, as described above, the transmission source port number may be the fixed value.

Here, as described in FIG. 4, the essential items in the IP header are the IP packet length and the destination IP address. Further, as described in FIG. 5, the essential items in the UDP header are the UDP packet length and the destination port number.

Accordingly, to broadcast the IP packets in the Generic packets, the IP headers can be compressed to compressed IP headers that include only the information on the IP packet length and the destination IP address. The UDP headers can be compressed to compressed UDP headers that include only the information on the UDP packet length and the destination port number.

Furthermore, when the information on the destination IP address and the destination port number are set to have the fixed lengths, since the IP header and the UDP header each have the fixed lengths of 20 bytes and eight bytes, respectively, the IP packet length and the UDP packet length can be obtained from the length information in the Generic header (FIG. 2).

As discussed above, the IP header and the UDP header can be compressed to the information on the destination IP address and the destination port number. Even if such compression is performed, the proper IP header and UDP header free from a problem to be handled by the reception apparatus 20 can be restored.

Therefore, to create the Generic packet in which the IP packet is arranged, the creation unit 11 in the transmission apparatus 10 compresses the IP header and the UDP header included in the IP packet to the information on the destination IP address and the destination port number as necessary.

FIG. 6 is a drawing describing the type information (Type) in the Generic header illustrated in FIG. 2.

As described in FIG. 2, the type information expresses the presence/absence of the compressed IP header and UDP header, that is, whether the IP header in the IP packet arranged in the Generic payload and the UDP header in the UDP packet included in the IP packet are compressed.

The type information expresses the presence/absence of the compressed IP header and UDP header in the IP packet arranged in the Generic payload and also information on a type of data arranged in the Generic payload.

That is, in the case where data for padding (Padding) is arranged in the Generic payload, the type information is set to 000b (b expresses that a value immediately before b is a binary number).

Further, in the case where data for signaling (Signaling) is arranged in the Generic payload, the type information is set to 001b.

Further, in the case where the IP packet in IPv4 in which neither the IP header nor the UDP header is compressed is arranged in the Generic payload, that is, the IP packet is arranged in the Generic payload without change, the type information is set to 010.

Additionally, in the case where the IP packet in IPv4 with the compressed IP header and UDP header is arranged in the Generic payload, the type information is set to 011.

Furthermore, in the case where a TS packet is arranged in the Generic payload, the type information is set to 100.

In FIG. 6, the type information with other values, namely, the type information with 101, 110, and 111 is undefined (Reserved).

Note that, the undefined type information can be assigned due to the facts, for example, of the arrangement of the IP packet in IPv6 with the uncompressed IP header and UDP header in the Generic payload and the arrangement of the IP packet in IPv6 with the compressed IP header and UDP header in the Generic payload.

In this case, whether the IP packet arranged in the Generic payload is the IP packet in IPv4 or the IP packet in IPv6 can be recognized by the type information, thus ensuring the restoration of the version (Version) of the IP header (FIG. 4).

Note that, as described above, this embodiment does not use the IP packet in IPv6 but uses the IP packet in IPv4 for ease of explanation.

Figure 7:
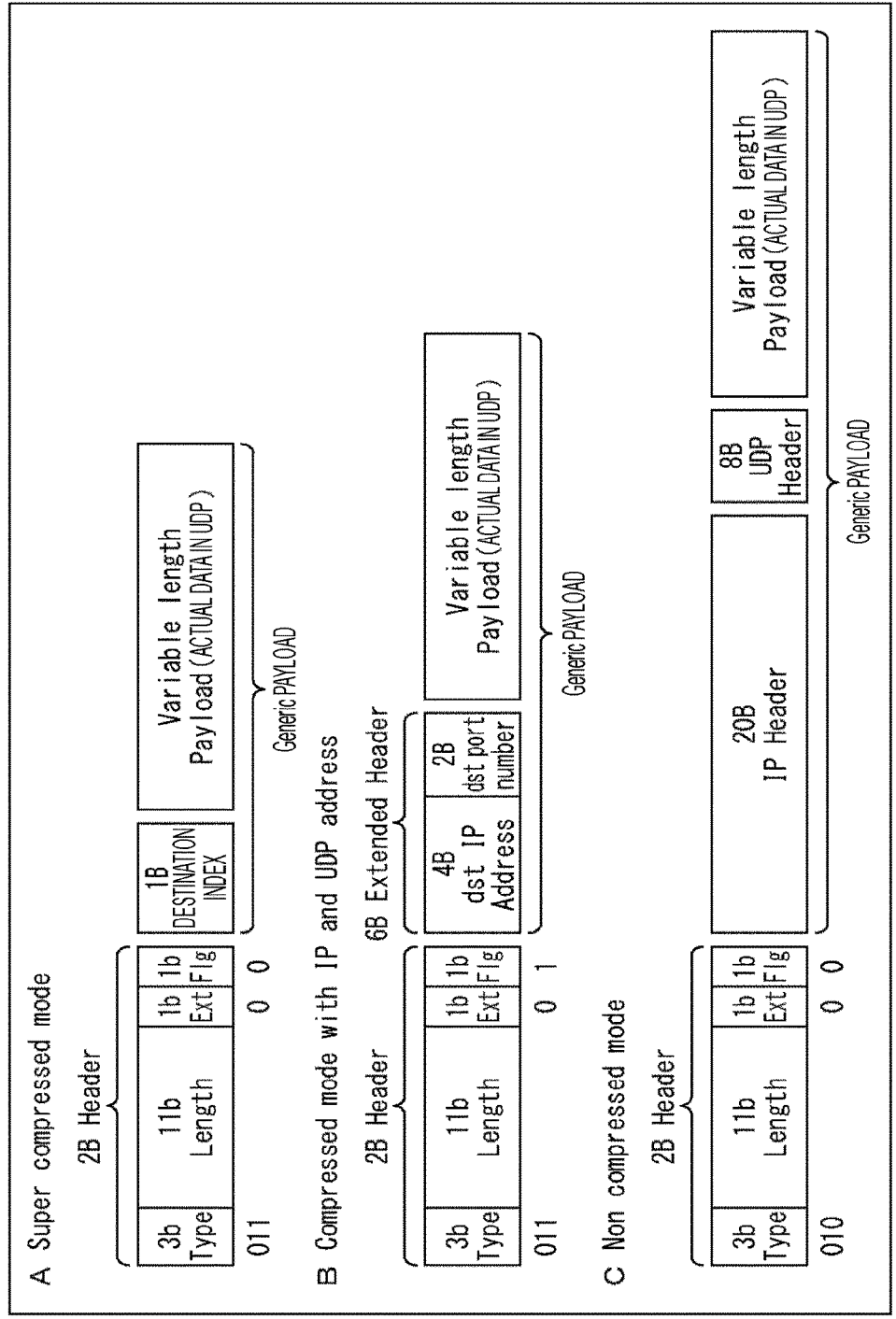
FIG. 7 is a drawing illustrating examples of configurations of the Generic packets in which the IP packets are arranged.

FIG. 7 is a drawing illustrating examples of configurations of the Generic packets in which the IP packets are arranged.

The creation unit 11 in the transmission apparatus 10 (FIG. 1) can create, for example, the Generic packets in three kinds of modes as the Generic packets including the IP packets.

The three kinds of modes include a super compressed mode (Super compressed mode), a compressed mode (Compressed mode with IP and UDP address), and a non-compressed mode (Non compressed mode).

The super compressed mode and the compressed mode compress the IP header included in the IP packet arranged in the Generic payload and the UDP header (in the UDP packet included in the IP packet) to the information on the destination IP address and the destination port number.

Note that, the compressed mode compresses the IP header and the UDP header to the destination IP address and the destination port number themselves. Meanwhile, the super compressed mode compresses the IP header and the UDP header to a destination index expressing the destination IP address and the destination port number and the destination index with a size less than the total size of the destination IP address and the destination port number.

Additionally, the non-compressed mode does not compress the IP header and the UDP header included in the IP packet arranged in the Generic payload.

A of FIG. 7 illustrates the example of the Generic packet in the super compressed mode.

The Generic packet in the super compressed mode is configured by arranging the type information, the length information, the Ext, the Flg, the destination index, and the actual data arranged in the payload in the UDP packet included in the IP packet in this order.

In the super compressed mode, the type information in the Generic header is set to 011, which expresses the arrangement of the IP packet in IPv4 with the compressed IP header and UDP header in the Generic payload.

Additionally, the length information in the Generic header is set to the length of the Generic payload.

Further, the Ext in the Generic header is set to 0 or 1 depending on whether the length of the Generic payload is 2047 bytes or less, that is, whether the Generic header is the usual header or the extended header. In A of FIG. 7, since the length of the Generic payload is 2047 bytes or less and therefore the Generic header is the usual header, the Ext is set to 0.

Moreover, the Flg in the Generic header is set to the kind information for the compression of the IP header and the UDP header in the IP packet in the Generic payload.

The kind information is the information expressing whether the IP header and the UDP header are compressed in any kind (mode) of the super compressed mode or the compressed mode. This embodiment assigns 0 and 1 for the super compressed mode and the compressed mode, respectively.

Therefore, the Flg in A of FIG. 7 is set to 0, which expresses the super compressed mode.

In the Generic payload, the destination index as the compression result of the compression on the IP header and the UDP header in the IP packet is arranged. Following the destination index, the actual data arranged in the payload in the UDP packet included in the IP packet is arranged.

The destination index has a fixed size of less than the total size of the destination IP address and the destination port number.

That is, the destination IP address (dst IP Address) has the size of four bytes, the destination port number (dst port number) has the size of two bytes, and the total size of these is six bytes. Meanwhile, in A of FIG. 7, the destination index has the size of one byte, which is smaller than the six bytes.

As described above, the super compressed mode compresses the IP header and the UDP header only to the destination index with one byte. This ensures efficiently broadcasting the Generic packets and eventually the IP packets.

Note that, details of the destination index will be described later.

Additionally, in FIG. 7 (similarly to the drawings described later), "variable length," which is arranged in the Generic payload and described in the actual data part in the UDP packet, expresses the actual data having the variable length.

In the Generic packet, a part other than the actual data in the UDP packet has the fixed length.

B of FIG. 7 illustrates the example of the Generic packet in the compressed mode.

The Generic packet in the compressed mode is configured by arranging the type information, the length information, the Ext, the Flg, the destination IP address, the destination port number, and the actual data arranged in the payload in the UDP packet included in the IP packet in this order.

In the compressed mode, similarly to the super compressed mode, the type information in the Generic header is set to 011, which expresses the arrangement of the IP packet in IPv4 with the compressed IP header and UDP header in the Generic payload.

Additionally, similarly to the super compressed mode, the length information in the Generic header is set to the length of the Generic payload.

Further, similarly to the super compressed mode, the Ext in the Generic header is set to 0 or 1 depending on whether the length of the Generic payload is 2047 bytes or less. In B of FIG. 7, since the length of the Generic payload is 2047 bytes or less and therefore the Ext is set to 0.

Moreover, the Flg in the Generic header is set to the kind information for the compression of the IP header and the UDP header in the IP packet in the Generic payload. The Flg in B of FIG. 7 is set to 1 expressing the compressed mode.

In the Generic payload, the destination IP address and the destination port number as the compression result of the compression on the IP header and the UDP header in the IP packet are arranged. Following the destination IP address and the destination port number, the actual data arranged in the payload in the UDP packet included in the IP packet is arranged.

As described above, the compressed mode compresses the IP header and the UDP header only to the destination IP address and the destination port number. This ensures efficiently broadcasting the Generic packets and eventually the IP packets.

C of FIG. 7 illustrates the example of the Generic packet in the non-compressed mode.

The Generic packet in the non-compressed mode is configured by arranging the type information, the length information, the Ext, the Flg, the IP header, the UDP header, and the actual data arranged in the payload in the UDP packet included in the IP packet in this order.

In the non-compressed mode, the type information in the Generic header is set to 010, which expresses the arrangement of the IP packet in IPv4 with the uncompressed IP header and UDP header in the Generic payload.

Additionally, similarly to the super compressed mode and the compressed mode, the length information in the Generic header is set to the length of the Generic payload.

Further, similarly to the super compressed mode and the compressed mode, the Ext in the Generic header is set to 0 or 1 depending on whether the length of the Generic payload is 2047 bytes or less. In C of FIG. 7, since the length of the Generic payload is 2047 bytes or less and therefore the Ext is set to 0.

Since the Flg in Generic header is set to the kind information for the compression of the IP header and the UDP header in the IP packet in the Generic payload, the Flg does not function in the non-compressed mode. The Flg is set to 0 in C of FIG. 7.

The IP packet including the UDP packet is arranged in the Generic payload without change. Accordingly, in the Generic payload, the IP header and the UDP header are arranged and subsequently the actual data arranged in the payload in the UDP packet is arranged.

Note that, a value accommodating the kind information expressed by the Flg can be assigned for the type information.

That is, for example, in the above-described FIG. 6, 011 is assigned for the type information according to the IP packet in IPv4 with the compressed IP header and UDP header being arranged in the Generic payload. Meanwhile, for example, 011 can be assigned for the type information according to the compression of the IP header and the UDP header to the destination index. Another value can be assigned for the type information according to the compression of the IP header and the IMP header to the destination IP address and the destination port number.

In this case, the Flg can be dispensed with or used to express information other than the kind information.

FIG. 8 is a drawing illustrating an example of the destination index.

The destination index is made correspond to a set of the destination IP address and the destination port number.

A table that makes the destination index correspond to the set of the destination IP address and the destination port number is referred to as an index table.

FIG. 8 illustrates the example of the index table.

In this embodiment, since a size of the destination index is one byte (eight bits), 256 ($=2^8$) patterns of destination indexes are present.

In the index table, the sets of the destination IP addresses and the destination port numbers are made correspond to the respective 256 patterns of the destination indexes.

Here, in the index table in FIG. 8, in addition to the sets of the destination IP addresses and the destination port numbers being made correspond to the destination indexes, sets of the transmission source IP addresses and the transmission source port numbers are also made correspond to.

The creation unit 11 in the transmission apparatus 10 stores the index table in FIG. 8. Then, the creation unit 11 searches for the destination index made correspond to the destination IP address, the destination port number, the transmission source IP address, and the transmission source port number set to the IP header and the UDP header in the IP packet arranged in the Generic packet from the index table to compress the IP header and the UDP header to the destination index.

Similarly to the creation unit 11, the restoration unit 22 in the reception apparatus 20 also stores the index table in FIG. 8. Then, the restoration unit 22 searches for the destination IP address, the destination port number, the transmission source IP address, and the transmission source port number made correspond to the destination index. The restoration unit 22 restores the corresponding items of the IP header and the UDP header to the destination IP address, the destination port number, the transmission source IP address, and the transmission source port number.

Note that, in the index table in FIG. 8, in addition to the sets of the destination IP addresses and the destination port numbers, the sets of the transmission source IP addresses and the transmission source port numbers are made correspond to the destination indexes. However, it is possible to make only the sets of the destination IP addresses and the destination port numbers correspond to the destination indexes. In this case, the restoration unit 22 in the reception apparatus 20 can restore the transmission source IP address and the transmission source port number to the fixed values or obtain the values from the protocol on the upper layer. Since the information to identify the broadcasting station can be obtained by the signaling in the upper layer, the transmission source IP address and the transmission source port number need not to be referred to for broadcasting. Therefore, setting the fixed values to the transmission source IP address and the transmission source port number does not especially cause a problem.

Here, ATSC M/H A/153 Part 3 specifies the use of 10.0.0.0-10.255.255.255, 172.16.0.0-172.31.255.255, 192.168.0.0-192.168.255.255 as the transmission source IP address. The index table in FIG. 8 is compliant with ATSC M/H A/153 Part 3, and the transmission source IP address is 192.168.0.0. Note that, in the index table in FIG. 8, the same transmission source IP address of 192.168.0.0 is made correspond to all 256 patterns of destination indexes.

Meanwhile, it is possible to make a different transmission source IP address correspond to a different destination index.

Moreover, in the index table in FIG. 8, the destination IP addresses are the IP addresses starting from 224 for IP multicast.

Further, an Internet Assigned Numbers Authority (IRNA) does not especially assign the port numbers in the 60000s. Accordingly, in the index table in FIG. 8, the port numbers in the 60000s for which the port numbers are not assigned by the IRNA are used in principle for the transmission source port numbers and the destination port numbers. Note that, in the index table in FIG. 8, although the same transmission source port number, 60000, is made correspond to all 256 patterns of destination indexes, a different transmission source port number can be made correspond to a different destination index.

Additionally, in the IANA, the IP addresses and the port numbers used by the ATSC service for Network Time Protocol Version 4 (NTPv4) and Service Signaling channel are registered. That is, the IRNA registers 224.0.1.1 and 123 as the respective IP address and port number used for NTPv4 by the ATSC service. Further, the IRNA registers 224.0.23.60 and 4937 as the respective IP address and port number used for Service Signaling channel by the ATSC service.

Therefore, in the index table FIGS. 8, 224.0.1.1 and 123 are registered as the IP address and the port number for NTPv4, respectively, and 224.0.23.60 and 4937 are registered as the IP address and the port number for Service Signaling channel, respectively. Note that, in the index table in FIG. 8, the destination index of 0x00 (0x expresses that a value subsequent to 0x is a hexadecimal number) is made correspond to the set of 224.0.1.1 and 123, which are the IP address and the port number in NTPv4. Further, the destination index of 0x01 is made correspond to the set of 224.0.23.60 and 4937, which are the IP address and the port number in Service Signaling channel.

As described above, the creation unit 11 and the restoration unit 22 in the broadcast system of FIG. 1 store the index table in FIG. 8.

Then, in the super compressed mode, the creation unit 11 compresses the IP header and the UDP header in IP packet arranged in the Generic packet to the destination index made correspond to the set of the destination IP address and the destination port number included in the IP header and the UDP header on the basis of the index table in FIG. 8.

On the other hand, the restoration unit 22 restores the destination IP address and the destination port number made correspond to the destination index from the destination index on the basis of the index table in FIG. 8.

Note that, in the index table in FIG. 8, the sets of the transmission source IP addresses and the transmission source port numbers are made correspond to the destination indexes in addition to the sets of the destination IP addresses and the destination port numbers; therefore, in addition to the destination IP address and the destination port number, the transmission source IP address and the transmission source port number can also be restored from the destination index.

Note that, in the index table in FIG. 8, the same sets of the transmission source IP addresses and the transmission source port numbers are made correspond to all 256 patterns of destination indexes. In this case, the transmission source IP address and the transmission source port number are not made correspond to the destination index but can be predetermined at fixed values.

Additionally, this embodiment employs one byte as the destination index; however, as a size of the destination index, a size less than one byte and exceeding one byte can be employed.

When the size of less than one byte is employed as the size of the destination index, although the number of sets of the destination IP addresses and the destination port numbers made correspond to the destination indexes decreases, the size of the Generic packet can be reduced.

Although the use of the size exceeding one byte as the size of the destination index increases the size of the Generic packet, the number of sets of the destination IP addresses and the destination port numbers made correspond to the destination indexes can be increased.

The size of the destination index can be determined by, for example, an extent of required degree of freedom as the sets of the destination IP addresses and the destination port numbers.

Moreover, the destination index can include a table selection bit of one bit or more. In this case, the plurality of index tables are prepared by the number expressible by the table selection bit. The used index table can be selected corresponding to the table selection bit in the destination index. Furthermore, in the index table selected corresponding to the table selection bit, the sets of the destination IP addresses and the destination port numbers can be made correspond to the remaining bits in the destination index.

Furthermore, the transmission apparatus 10 can update the index table as necessary. The transmission apparatus 10 can broadcast the index table after the update to the reception apparatus 20 to cause the reception apparatus 20 to store the index table. Besides, for example, a creation rule to create the index table is specified for the index table under the broadcast standard that the broadcast system in FIG. 1 is compliant with. The transmission apparatus 10 and the reception apparatus 20 can create the index table in accordance with the creation rule.

Note that, as the mode for the Generic packet including the IP packet, in addition to the super compressed mode, the compressed mode, and the non-compressed mode, an ultra-compressed mode can be provided.

The ultra-compressed mode uses predetermined fixed values as the destination IP addresses and the destination port numbers. The Generic payload does not include the information on the IP header and the UDP header at all.

Accordingly, while the ultra-compressed mode loses the degree of freedom for the destination IP address and the destination port number, the ultra-compressed mode can reduce the size of the Generic packet more than the super compressed mode and further efficiently broadcast the Generic packets, eventually the IP packets.

FIG. 9 is a drawing showing lengths of (parts corresponding to) the IP header and the UDP header in the IP packet arranged in the Generic packets in the respective super compressed mode, compressed mode, and non-compressed mode.

In the Generic packet in the super compressed mode (Super compressed mode), the IP header and the UDP header in the IP packet are compressed to the destination indexes.

Accordingly, the length of the parts corresponding to the IP header and the UDP header in the IP packet (header length) is one byte, which is the size of the destination index.

Since the total size of the IP header and the UDP header is 28 (=20+8) bytes, the super compressed mode can achieve the compression (reduction) of the size by 27 (=28−1) bytes compared with the case where neither the IP header nor the UDP header are compressed.

In the Generic packet in the compressed mode (Compressed mode with IP and UDP address), the IP header and the UDP header in the IP packet are compressed to the destination IP address and the destination port number. Accordingly, the length of the parts corresponding to the IP header and the UDP header in the IP packet (header length) is six (=4+2) bytes, which is the total size of the destination IP address and the destination port number.

Since the total size of the IP header and the UDP header is 28 bytes, the compressed mode can achieve the compression of the size by 22 (=28−6) bytes compared with the case where neither the IP header nor the UDP header are compressed.

In the Generic packet in the non-compressed mode (Non compressed mode), the length of the IP header and the UDP header in the IP packet (header length) remains to be 28 bytes. That is, the non-compressed mode does not compress the IP header and the UDP header (the compression of 0-byte size is achieved).

As described above, the super compressed mode and the compressed mode can achieve the effect of the compression exceeding 20 bytes. Additionally, the super compressed mode brings the effect of the compression of the IP header and the UDP header larger than that of the compressed mode.

For example, an average transmission rate of a physical layer in ATSC 3.0 is approximately 40 Mbps. Meanwhile, with the super compressed mode and the compressed mode, a transmission capacity of approximately 1% of 40 Mbps, namely, approximately 400 kbps can be saved. In the case where the transmission capacity is saved by approximately 400 kbps by the super compressed mode, audio data with approximately 100 kbps can be broadcasted through approximately four channels separately.

<Creating Process of Generic Packet by Creation Unit 11>

Figure 10:
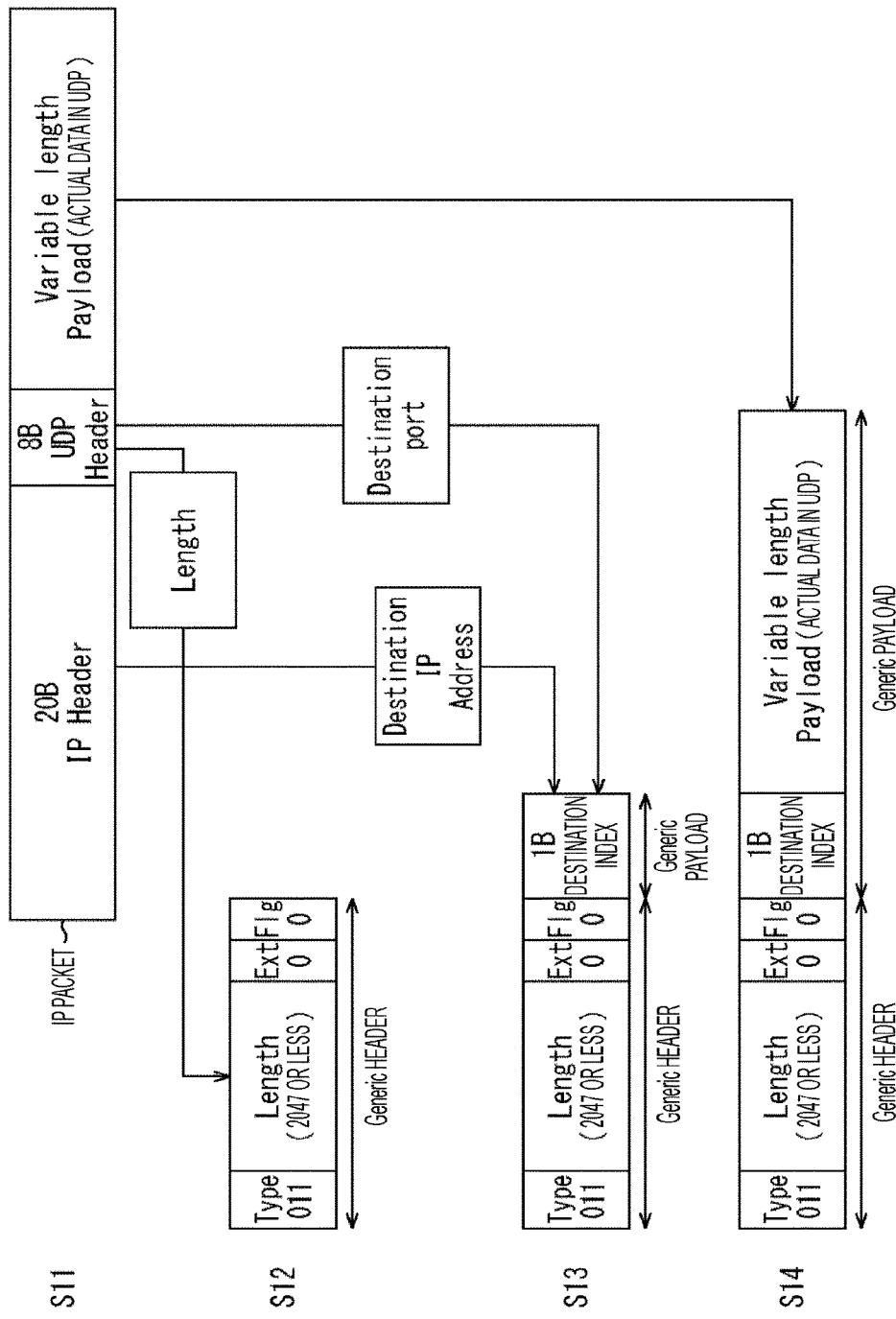
FIG. 10 is a drawing describing an example of a creation process to create the Generic packet.
Figure 11:
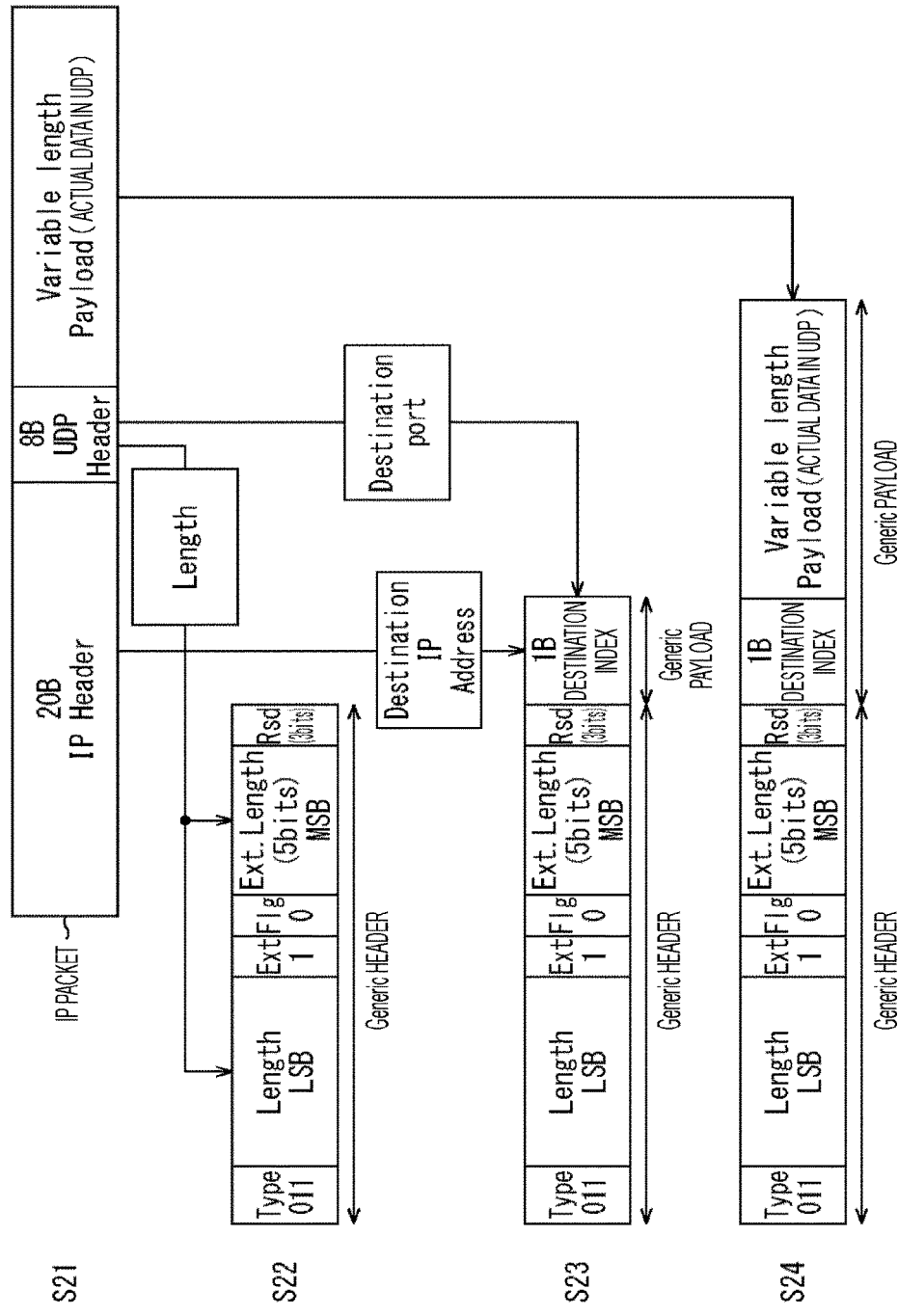
FIG. 11 is a drawing describing an example of the creation process to create the Generic packet.
Figure 12:
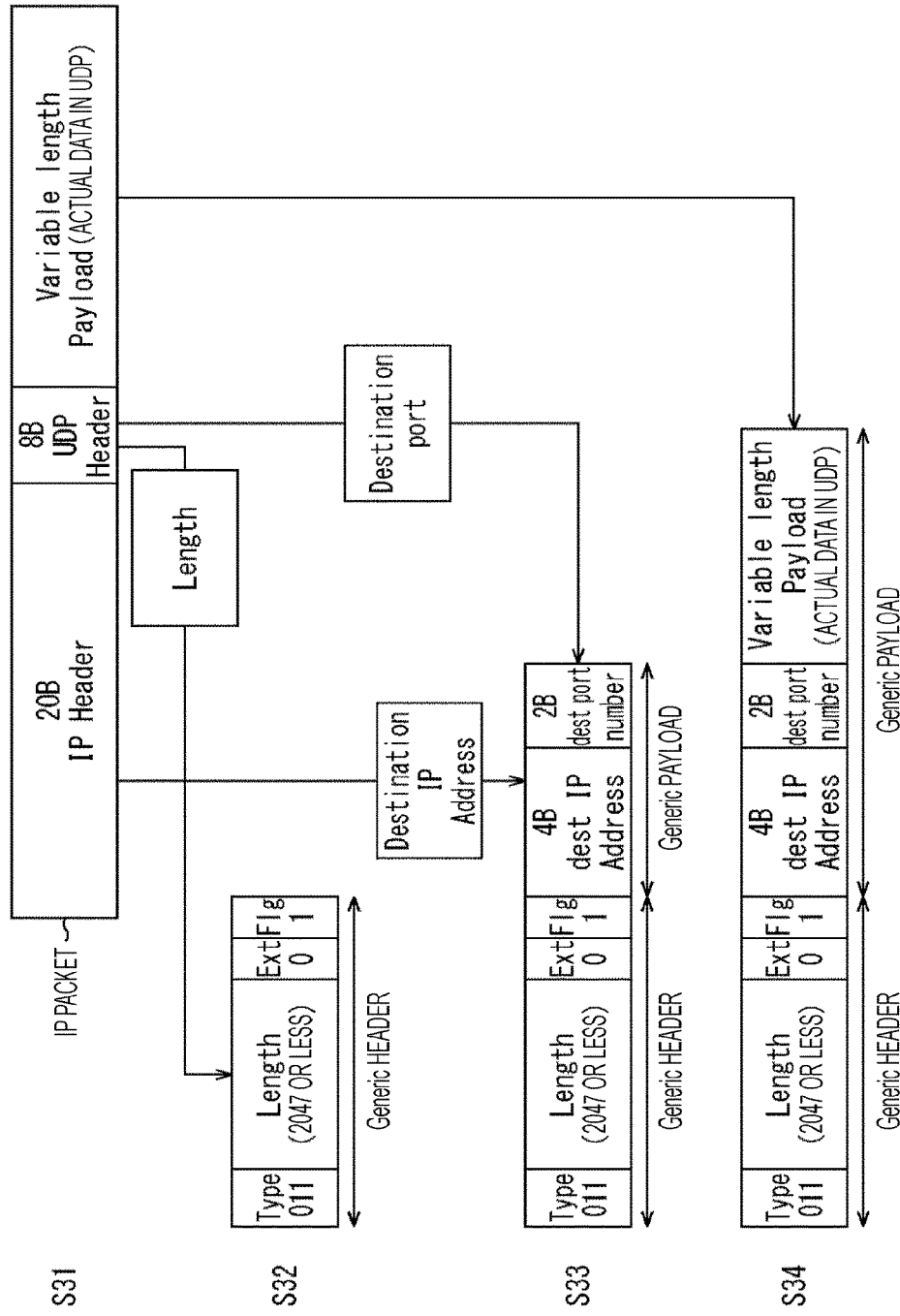
FIG. 12 is a drawing describing an example of the creation process to create the Generic packet.

The following describes the example of the creation process to create the Generic packet by the creation unit 11 with reference to FIGS. 10, 11, and 12.

FIG. 10 illustrates an example of the creation process to create the Generic packet with the Generic payload of 2047 bytes or less in the super compressed mode.

At step S11, the creation unit 11 recognizes the destination IP address (Destination IP Address) from the IP header in the IP packet. Furthermore, the creation unit 11 recognizes the UDP packet length (Length) and the destination port number (Destination port) from the UDP header in the IP packet.

At step S12, the creation unit 11 creates the Generic header.

Here, in the super compressed mode, the creation unit 11 sets the type information in the Generic header to 011, which expresses the compression of the IP header and the UDP header.

Additionally, the creation unit 11 subtracts eight bytes, which is the length (size) of the UDP header, from the UDP packet length recognized from the UDP header to obtain a value found by adding one byte of the destination index to the subtracted value as the length of the Generic payload in the super compressed mode. Then, the creation unit 11 sets the length information in the Generic header to the length of the Generic payload in the super compressed mode, which is obtained from the UDP packet length.

Further, in FIG. 10, the Generic payload is 2047 bytes or less; therefore, the usual header is used as the Generic header among the usual header and the extended header. Therefore, the creation unit 11 sets the Ext in the Generic header to 0, which expresses the Generic header being the usual header.

Further, the creation unit 11 sets the Flg in the Generic header to 0 expressing the super compressed mode.

Note that, at step S12, the length of the Generic payload in the super compressed mode can be obtained from the UDP packet length recognized from the UDP header. Besides, the length of the Generic payload can be obtained from the IP packet length recognized from the IP header.

That is, the length of the Generic payload in the super compressed mode can be obtained by subtracting the 28 (=20+8) bytes, which is the total size of the IP header and the UDP header, from the IP packet length and adding the one byte of the destination index to the subtracted value.

At step S13, the creation unit 11 refers to the index table (FIG. 8) and searches for the destination index made correspond to the set of the destination IP address recognized from the IP header and the destination port number recognized from the UDP header. Then, the creation unit 11 adds the destination index as the Generic payload to the Generic header created at step S12.

At step S14, the creation unit 11 arranges the actual data arranged in the payload in the UDP packet included in the IP packet as the Generic payload subsequent to the destination index. This completes the Generic packet in the super compressed mode.

FIG. 11 illustrates an example of the creation process to create the Generic packet in the super compressed mode with the Generic payload larger than 2047 bytes.

At step S21, similarly to step S11 in FIG. 10, the creation unit 11 recognizes the destination IP address (Destination IP Address) from the IP header in the IP packet. The creation unit 11 recognizes the UDP packet length (Length) and the destination port number (Destination port) from the UDP header in the IP packet.

At step S22, the creation unit 11 creates the Generic header.

Here, in the super compressed mode, the creation unit 11 sets the type information in the Generic header to 011, which expresses the compression of the IP header and the UDP header.

Additionally, similarly to the case in FIG. 10, the creation unit 11 obtains the length of the Generic payload in the super compressed mode from the UDP packet length or the IP packet length. Then, the creation unit 11 sets the length information in the Generic header according to the length of the Generic payload in the super compressed mode, which is obtained from the UDP packet length or the IP packet length. Details of the setting of the length information will be described later.

Further, in FIG. 11, the Generic payload is larger than 2047 bytes; therefore, the extended header is used as the Generic header among the usual header and the extended header. Therefore, the creation unit 11 sets the Ext in the Generic header to 1, which expresses the Generic header being the extended header.

Further, the creation unit 11 sets the Flg in the Generic header to 0 expressing the super compressed mode.

Furthermore, the creation unit 11 adds the added byte of one byte after the Flg to extend the Generic header to the extended header.

In FIG. 11, since the Generic payload is larger than 2047 bytes, the length of the Generic payload cannot be set to only the 11-bit length information. With the Generic payload larger than 2047 bytes, the length of the Generic payload is set divided into the 11-bit length information and a part of or all the added byte.

That is, in FIG. 11, five bits in the added byte of one byte are assigned to length information for extension (Ext-.Length) and the remaining three bits become undefined (Rsd) (don't care).

The length of the Generic payload larger than 2047 bytes, that is, the length of the Generic payload expressed by 12 bits or more is divided into the lower 11 bits and the upper bit of the remaining one bit or more. Then, the lower 11 bits (LSB) for the length of the Generic payload are set to the 11-bit length information and the remaining upper bits (MSB) are set to the length information for extension of the added byte.

Note that, the maximum length of the IP packet is 65,535 bytes and can be expressed by 16 bits. Considering that the IP packet length includes the total size of the IP header and the UDP header (28 bytes), in the super compressed mode (similarly to the compressed mode), the length of the Generic payload can be expressed by 16 bits, which is the total of the 11-bit length information and the five-bit length information for extension, regarding any IP packet.

At step S23, similarly to the case in FIG. 10, the creation unit 11 refers to the index table (FIG. 8) and searches for the destination index made correspond to the set of the destination IP address recognized from the IP header and the destination port number recognized from the UDP header. Then, the creation unit 11 adds the destination index as the Generic payload to the Generic header (extended header) created at step S22.

At step S24, similarly to the case in FIG. 10, the creation unit 11 arranges the actual data arranged in the payload in the UDP packet included in the IP packet as the Generic payload subsequent to the destination index. This completes the Generic packet in the super compressed mode.

FIG. 12 illustrates an example of the creation process to create the Generic packet in the compressed mode with the Generic payload of 2047 bytes or less.

At step S31, similarly to step S11 in FIG. 10, the creation unit 11 recognizes the destination IP address (Destination IP Address) from the IP header in the IP packet. The creation unit 11 recognizes the UDP packet length (Length) and the destination port number (Destination port) from the UDP header in the IP packet.

At step S32, the creation unit 11 creates the Generic header.

Here, in the compressed mode, similarly to the super compressed mode in FIG. 10, the creation unit 11 sets the type information in the Generic header to 011, which expresses the compression of the IP header and the UDP header.

Additionally, the creation unit 11 subtracts the eight bytes, which is the length (size) of the UDP header, from the UDP packet length recognized from the UDP header to obtain a value found by adding the four bytes of the IP address and the two bytes of the destination port number to the subtracted value as the length of the Generic payload in the compressed mode. Then, the creation unit 11 sets the length information in the Generic header to the length of the Generic payload in the super compressed mode, which is obtained from the UDP packet length.

Further, in FIG. 12, the Generic payload is 2047 bytes or less; therefore, the usual header is used as the Generic header among the usual header and the extended header.

Therefore, the creation unit 11 sets the Ext in the Generic header to 0, which expresses the Generic header being the usual header.

Further, the creation unit 11 sets the Flg in the Generic header to 1 expressing the compressed mode.

Note that, at step S32, the length of the Generic payload in the compressed mode can be obtained from the UDP packet length recognized from the UDP header. Besides, the length of the Generic payload can be obtained from the IP packet length recognized from the IP header.

That is, the length of the Generic payload in the compressed mode can be obtained by subtracting the 28 (=20+8) bytes, which is the total size of the IP header and the UDP header, from the IP packet length and adding the four bytes of the destination IP address and the two bytes of the destination port number to the subtracted value.

At step S33, the creation unit 11 adds the destination IP address recognized from the IP header and the destination port number recognized from the UDP header to the Generic header created at step S32 as the Generic payload.

At step S34, the creation unit 11 arranges the actual data arranged in the payload in the UDP packet included in the IP packet as the Generic payload subsequent to the destination IP address and the destination port number. This completes the Generic packet in the compressed mode.

Note that, to create the Generic packet with the Generic payload larger than 2047 bytes in the compressed mode, as described in FIG. 11, a point that the Ext is set to 1, a point that the extended header is used as the Generic header, and a point that the length of the Generic payload is set divided into the 11-bit length information and the added byte differ from the case in FIG. 12.

Figure 13:
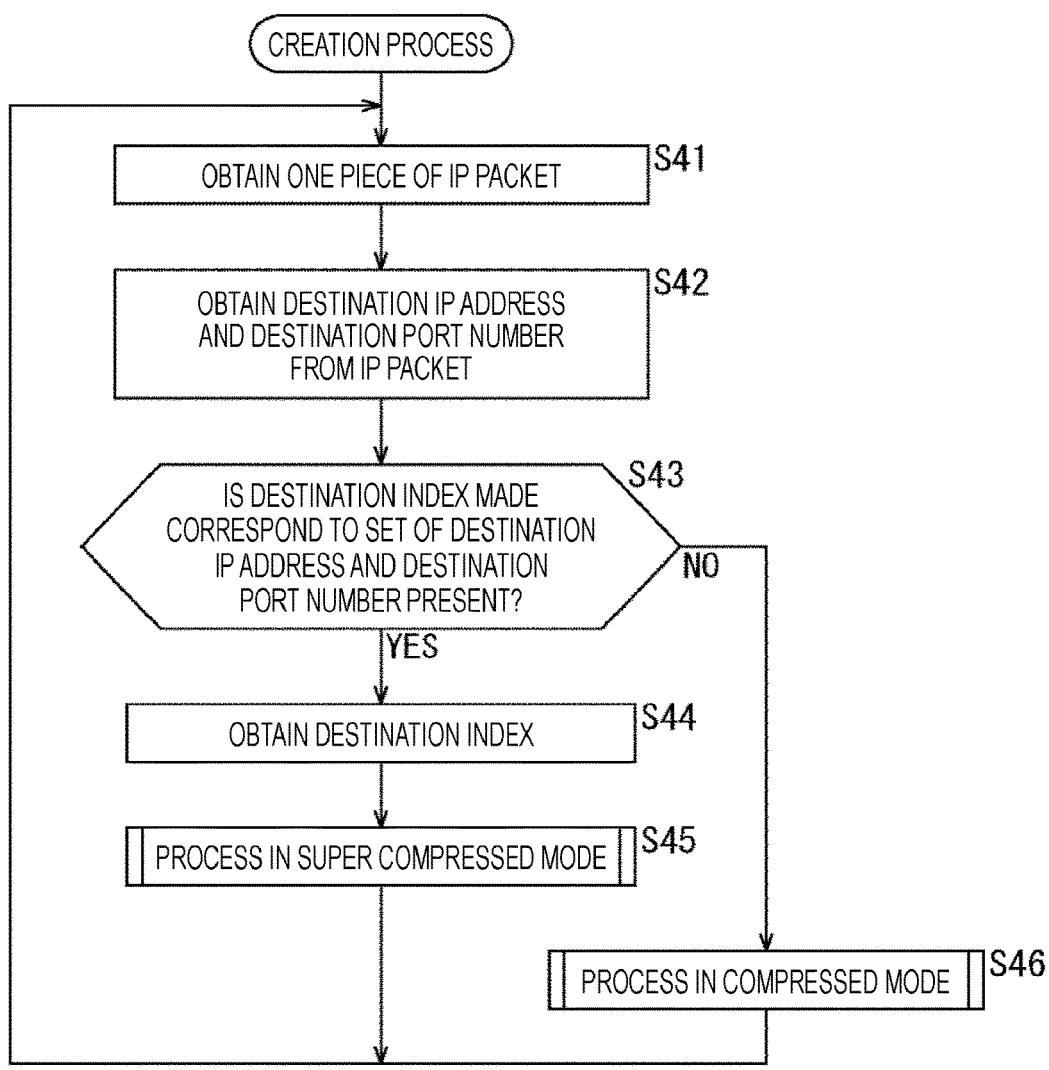
FIG. 13 is a flowchart describing an example of the creation process for the Generic packet.

FIG. 13 is a flowchart describing an example of the creation process of the Generic packet by the creation unit 11.

At step S41, the creation unit 11 waits for the IP packet to be supplied to itself and obtains one piece of IP packet (the IP packet including the UDP packet) supplied to itself as a transmission target IP packet. The process proceeds to step S42.

At step S42, the creation unit 11 obtains the destination IP address from the IP header in the transmission target IP packet and obtains the destination port number from the UDP header in the transmission target IP packet. The process proceeds to step S43.

At step S43, the creation unit 11 determines whether the destination index made correspond to the set of the destination IP address and the destination port number in the transmission target IP packet is present in the index table (FIG. 8).

At step S43, when it is determined that the destination index made correspond to the set of the destination IP address and the destination port number in the transmission target IP packet is present, that is, when the set of the destination IP address and the destination port number in the transmission target IP packet is registered with the index table, the process proceeds to step S44.

At step S44, the creation unit 11 obtains the destination index made correspond to the set of the destination IP address and the destination port number in the transmission target IP packet in the index table. The process proceeds to step S45.

At step S45, the creation unit 11 executes a process to create the Generic packet in the super compressed mode. The process returns to step S41.

Additionally, at step S43, when it is determined that the destination index made correspond to the set of the destination IP address and the destination port number in the transmission target IP packet is absent, that is, when the set of destination IP address and the destination port number in the transmission target IP packet are not registered with the index table, the process proceeds to step S46.

At step S46, the creation unit 11 executes the process to create the Generic packet in the compressed mode. The process returns to step S41.

The creation unit 11 supplies and transmits the Generic packet created at step S45 or S46 to the transmission unit 12.

Note that, in the case where the destination index is also made correspond to the transmission source IP address and the transmission source port number in addition to the destination IP address and the destination port number in the index table as illustrated in FIG. 8, whether such destination index is present can be determined at step S43.

That is, at step S43, whether the destination index made correspond to the destination IP address, the destination port number, the transmission source IP address, and the transmission source port number in the target IP packet is present can be determined.

Then, in the case where the destination index made correspond to the destination IP address, the destination port number, the transmission source IP address, and the transmission source port number in the target IP packet is present, the process can be executed in the super compressed mode (step S45). In the case where such destination index is absent, the process in the compressed mode (step S46) can be executed.

Figure 14:
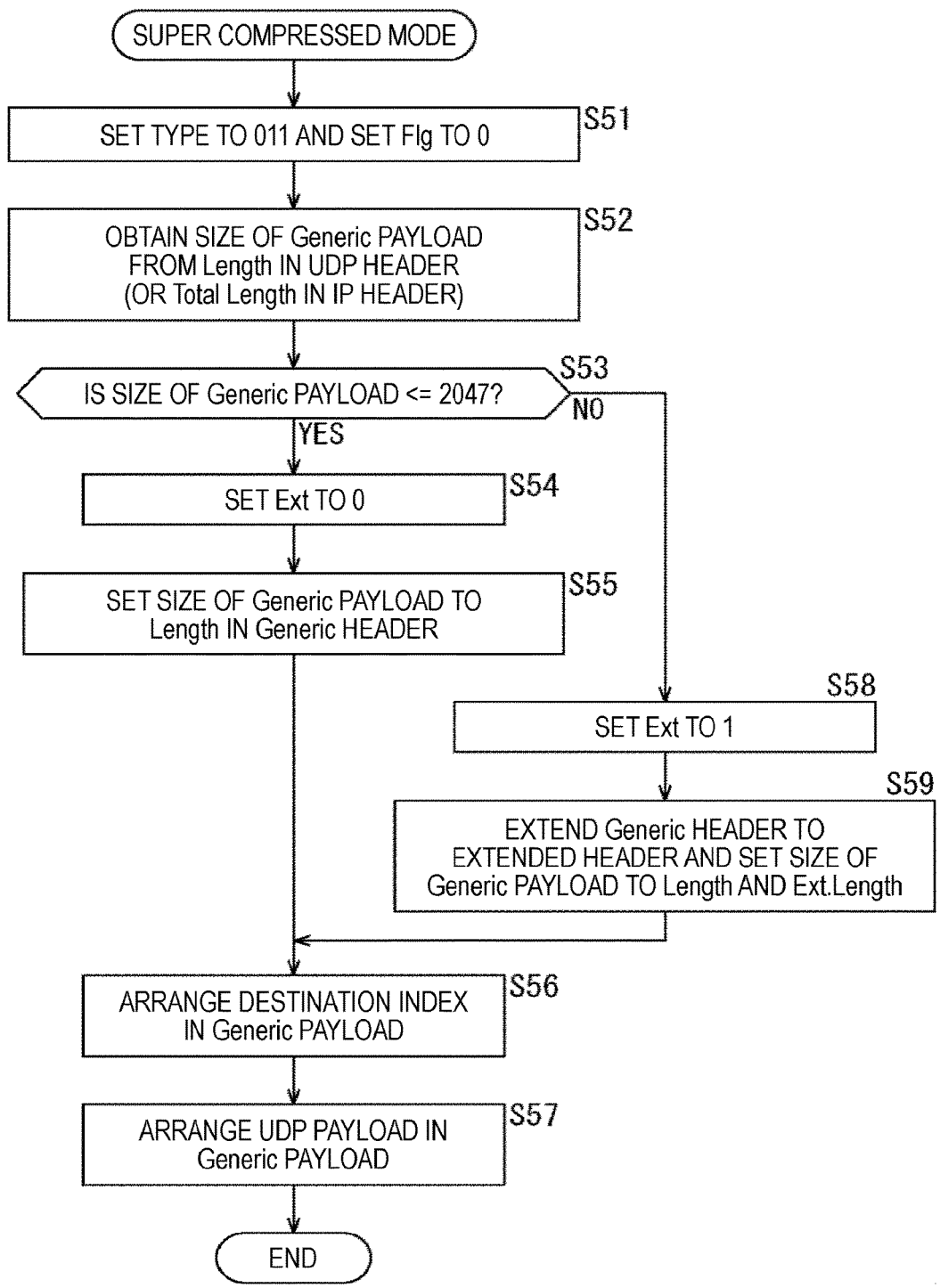
FIG. 14 is a flowchart describing an example of a process in the super compressed mode.

FIG. 14 is a flowchart describing an example of the process in the super compressed mode, which is executed at step S45 in FIG. 13.

At step S51, the creation unit 11 sets the type information in the Generic header to 011, which expresses the compression of the IP header and the UDP header. Furthermore, the creation unit 11 sets the Flg in the Generic header to 0 expressing the super compressed mode. The process proceeds from step S51 to step S52.

At step S52, the creation unit 11 obtains the UDP packet length or the IP packet length from the UDP header or the IP header in the transmission target IP packet. Furthermore, as described in FIGS. 10 and 11, the creation unit 11 obtains the length of the Generic payload in the super compressed mode from the UDP packet length or the IP packet length in the transmission target IP packet. The process proceeds from step S52 to step S53.

At step S53, the creation unit 11 determines whether the length of the Generic payload in the super compressed mode, which is obtained at step S52, is 2047 bytes or less.

At step S53, when it is determined that the length of the Generic payload is 2047 bytes or less, the process proceeds to step S54. The creation unit 11 sets the Ext in the Generic header to 0, which expresses that the Generic header is the usual header. The process proceeds to step S55.

At step S55, the creation unit 11 sets the length of the Generic payload in the super compressed mode obtained at step S52 to the length information in the Generic header. The process proceeds to step S56.

At step S56, the creation unit 11 arranges (adds) the destination index as the Generic payload immediately after the Generic header. The process proceeds to step S57.

At step S57, the creation unit 11 arranges the actual data arranged in the payload in the UDP packet included in the transmission target IP packet as the Generic payload subsequent to the destination index. This completes the Generic packet in the super compressed mode.

Then, the creation unit 11 supplies the Generic packet in the super compressed mode to the transmission unit 12 to terminate the process in the super compressed mode.

On the other hand, at step S53, when it is determined that the length of the Generic payload is not 2047 bytes or less, the process proceeds to step S58. The creation unit 11 sets the Ext in the Generic header to 1, which expresses that the Generic header is the extended header. The process proceeds to step S59.

At step S59, the creation unit 11 adds the added byte of one byte after the Flg in the usual header to extend the Generic header to the extended header. Furthermore, the creation unit 11 sets the five bits in the added byte as the length information for extension (Ext.Length), the lower 11 bits of the length of the Generic payload to the 11-bit length information (Length), and the remaining upper bits to the length information for extension (Ext.Length) of the added byte.

Afterwards, the process proceeds from step S56 to step S59. After that, at steps S56 and S57, the creation unit 11 executes the above-described processes to complete the Generic packet in the super compressed mode and supply the Generic packet to the transmission unit 12.

Figure 15:
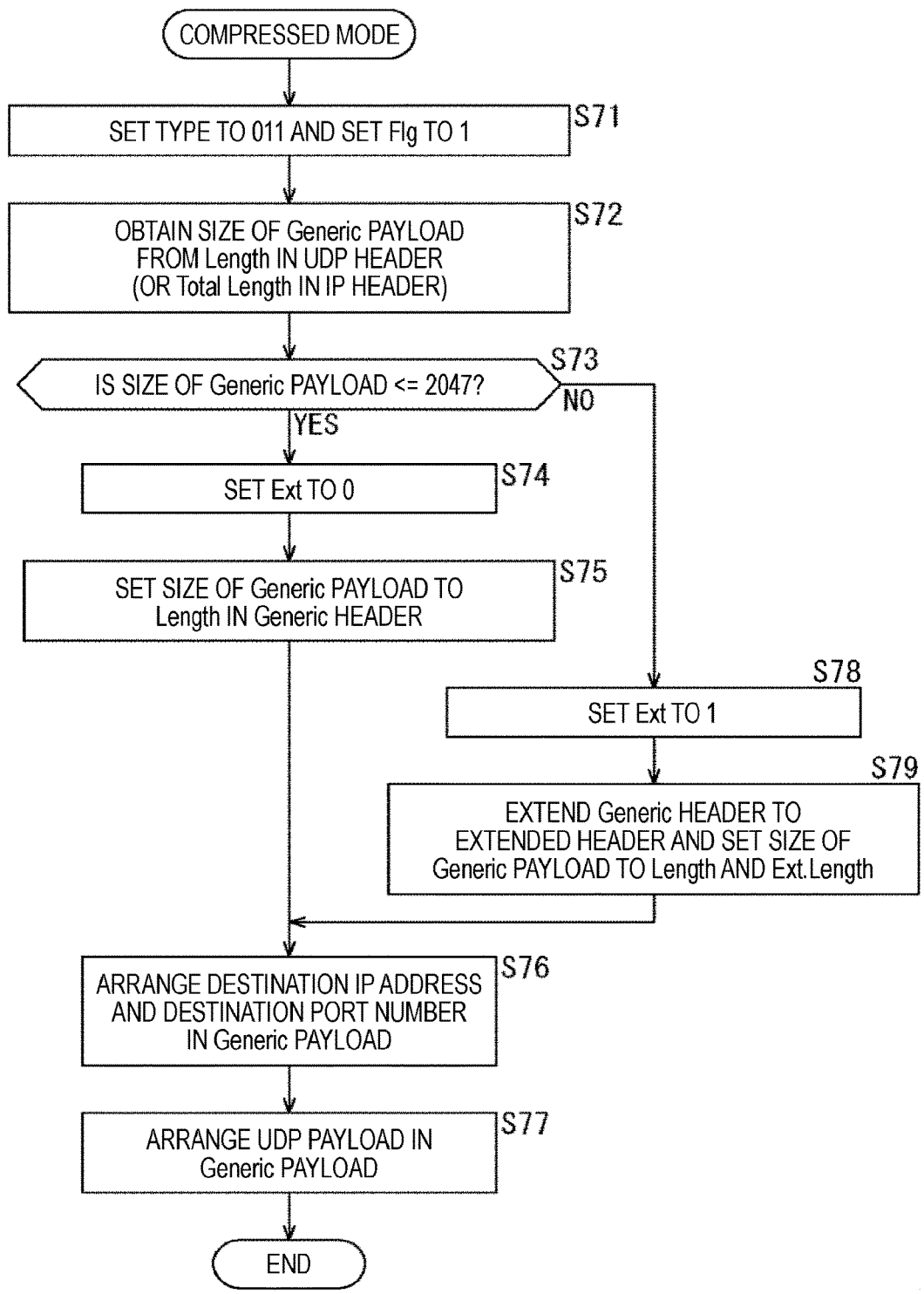
FIG. 15 is a flowchart describing an example of a process in the compressed mode.

FIG. 15 is a flowchart describing an example of the process in the compressed mode executed at step S46 in FIG. 13.

At step S71, the creation unit 11 sets the type information in the Generic header to 011, which expresses the compression of the IP header and the UDP header. Furthermore, the creation unit 11 sets the Flg in the Generic header to 1 expressing the compressed mode. The process proceeds from step S71 to step S72.

At step S72, similarly to step S52 in FIG. 14, the creation unit 11 obtains the length of the Generic payload in the compressed mode from the UDP header in the transmission target IP packet or the UDP packet length or the IP packet length obtained from the IP header. The process proceeds to step S73.

At step S73, the creation unit 11 determines whether the length of the Generic payload in the compressed mode, which is obtained at step S72, is 2047 bytes or less.

At step S73, when it is determined that the length of the Generic payload is 2047 bytes or less, the process proceeds to step S74. The creation unit 11 executes the respective processes similar to steps S54 and S55 in FIG. 14 at steps S74 and S75.

That is, at step S74, the creation unit 11 sets the Ext in the Generic header to 0. At step S75, the creation unit 11 sets the length of the Generic payload in the compressed mode, which is obtained at step S72, to the length information in Generic header.

Then, the process proceeds from step S75 to step S76. The creation unit 11 arranges (adds) the destination IP address and the destination port number of the transmission target IP packet immediately after the Generic header as the Generic payload. The process proceeds to step S77.

At step S77, the creation unit 11 arranges the actual data arranged in the payload in the UDP packet included in the transmission target IP packet as the Generic payload subsequent to the destination IP address and the destination port number. This completes the Generic packet in the compressed mode.

Then, the creation unit 11 supplies the Generic packet in the compressed mode to the transmission unit 12 to terminate the process in the compressed mode.

On the other hand, at step S73, when it is determined that the length of the Generic payload is not 2047 bytes or less, the process proceeds to step S78. The creation unit 11 executes the respective processes similar to steps S58 and S59 in FIG. 14 at steps S78 and S79. This extends the Generic header to the extended header and sets the length of the Generic payload to the length information (Length) and the length information for extension (Ext.Length) of the added byte.

Afterwards, the process proceeds from step S79 to step S76. After that, at steps S76 and S77, the creation unit 11 executes the above-described processes to complete the Generic packet in the compressed mode and supply the Generic packet to the transmission unit 12.

Here, as described in FIG. 9, the super compressed mode brings the effect of the compression of the IP header and the UDP header larger than that of the compressed mode.

In the case where the destination index made correspond to the destination IP address and the destination port number (and the transmission source IP address and the transmission source port number) in the transmission target IP packet is present in the index table, the creation process in FIG. 13 creates the Generic packet in the super compressed mode whose effect of compression is larger than that of the compressed mode. In the case where such destination index is absent, the creation process creates the Generic packet in the compressed mode whose effect of compression is smaller than the super compressed mode.

Accordingly, making the destination IP address and the destination port number (and the transmission source IP address and the transmission source port number) of high frequency of use correspond to the destination index and registering the items with the index table allows further efficient broadcast of the Generic packet and eventually the IP packet.

<Restoration Process of IP Packet by Restoration Unit 22>

Figure 16:
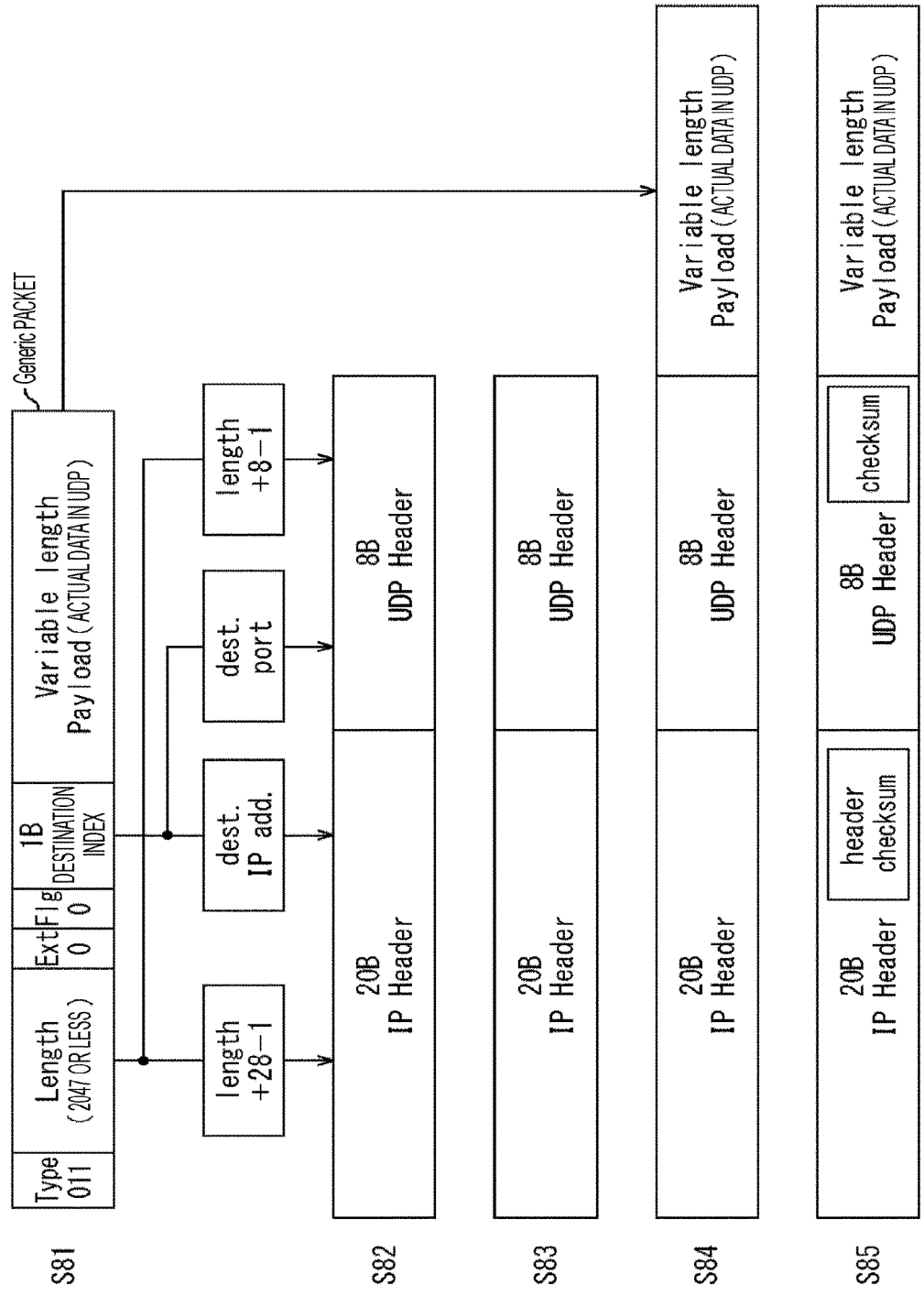
FIG. 16 is a drawing describing an example of a restoration process to restore the IP packet from the Generic packet.

FIG. 16 is a drawing describing an example of the restoration process to restore the IP packet from the Generic packet by the restoration unit 22.

At step S81, the restoration unit 22 recognizes the presence/absence of the compressed IP header and UDP header in the IP packet arranged in the Generic payload on the basis of the type information (Type) in the Generic header.

Furthermore, the restoration unit 22 recognizes whether the Generic header is the usual header or the extended header on the basis of the Ext in the Generic header.

Further, when the restoration unit 22 recognizes that the IP header and the UDP header in the IP packet arranged in the Generic payload are compressed from the type information (Type), the restoration unit 22 recognizes whether the Generic packet is the Generic packet in the compressed mode or the Generic packet in the super compressed mode on the basis of the Flg in the Generic header.

In FIG. 16, since the type information (Type) is 011, it is recognized that the IP header and the UDP header in the IP packet arranged in the Generic payload are compressed.

Further, in FIG. 16, since the Flg is 0, it is recognized that the Generic packet is the Generic packet in the super compressed mode.

Further, in FIG. 16, since the Ext is 0, it is recognized that the Generic header is the usual header.

Afterwards, the restoration unit 22 recognizes the length (length) of the Generic payload and the destination IP address (dest. IP add.) and the destination port number (dest. port) in the IP packet arranged in the Generic payload.

That is, in FIG. 16, since the Generic header is the usual header, the value set to the length information (length) in Generic header, which is the usual header, is recognized as the length (length) of the Generic payload.

Additionally, in FIG. 16, since the Generic packet is the Generic packet in the super compressed mode, the one-byte destination index is arranged at the head of the Generic payload immediately after the Generic header. The restoration unit 22 recognizes the destination IP address and the destination port number made correspond to the destination index through searching from the index table (FIG. 8).

Here, with the Generic header as the extended header, a value expressed by a bit string where the length information (length) of the Generic header as the extended header is configured to be the lower bits and the length information for extension (Ext.Length) of the added byte is configured to be the upper bits is recognized as the length (length) of the Generic payload.

Additionally, with the Generic packet being the Generic packet in the compressed mode, since the four-byte destination IP address and the two-byte destination port number are arranged at the head of the Generic payload immediately after the Generic header, the restoration unit 22 recognizes the destination IP address and the destination port number.

At step S82, the restoration unit 22 restores the destination IP address and the IP packet length included in the IP header in the IP packet and the destination port number and the UDP packet length included in the UDP header in the IP packet.

That is, the restoration unit 22 restores the destination IP address and the destination port number, which are recognized from the Generic packet, as the destination IP address included in the IP header in the IP packet and the destination port number included in the UDP header in the IP packet, respectively.

Furthermore, the restoration unit 22 adds 20 bytes of the IP header and eight bytes of the UDP header to the length (length) of the Generic payload recognized from the Generic packet. The restoration unit 22 subtracts one byte of the destination index from the added value to restore the IP packet length (length+28−1) included in the IP header.

Moreover, the restoration unit 22 adds eight bytes of the UDP header to the length (length) of the Generic payload recognized from the Generic packet. The restoration unit 22 subtracts one byte of the destination index from the added value to restore the UDP packet length (length+8−1) included in the UDP header.

Here, with the Generic packet being the Generic packet in the compressed mode, the destination IP address and the destination port number, which are arranged at the head of the Generic payload immediately after the Generic header, are restored as the destination IP address included in the IP header in the IP packet and the destination port number included in the UDP header in the IP packet, respectively.

Further, 20 bytes of the IP header and eight bytes of the UDP header are added to the length of the Generic payload (length) and six bytes of the total size of the destination IP address and the destination port number arranged in the Generic payload are subtracted from the added value to restore the IP packet length included in the IP header.

Moreover, eight bytes of the UDP header is added to the length (length) of the Generic payload and six bytes of the total size of the destination IP address and the destination port number arranged in the Generic payload are subtracted from the added value to restore the UDP packet length included in the UDP header.

At step S83, the restoration unit 22 restores the items other than the destination IP address, the IP packet length, and the checksum included in the IP header to predetermined fixed values. Furthermore, the restoration unit 22 restores the item other than the destination port number, the UDP packet length, and the checksum included in the UDP header (that is, the transmission source port number) to the predetermined fixed value.

As described above, the items included in the IP header are restored except for the checksum, and the items included in the UDP header are restored except for the checksum.

At step S84, the restoration unit 22 arranges the actual data arranged in the Generic payload after the IP header including the items restored up to the present and the UDP header including the items restored up to the present to configure the IP packet in UDP/IP.

Then, at step S85, the restoration unit 22 actually calculates the checksums included in the IP header and the UDP header using the IP packet configured at step S84 to restore the respective checksums.

As described above, the IP packet (with the compressed IP header and UDP header) arranged in the Generic payload is restored to the IP packet with the proper IP header and UDP header.

As described above, the restoration unit 22 can restore the IP packet arranged in the Generic payload from only the Generic packet with the Generic payload (without the use of another Generic packet) to the IP packet with the proper IP header and UDP header.

Accordingly, the IP packet can be quickly restored from the Generic packet for quick process.

Here, in the case where the destination index is also made correspond to the transmission source IP address and the transmission source port number in addition to the destination IP address and the destination port number in the index table as illustrated in FIG. 8, the transmission source IP address included in the IP header and the transmission source port number included in the UDP header can be restored to the transmission source IP address and the transmission source port number made correspond to the destination index in the index table, respectively.

Additionally, in the case where the transmission apparatus 10, in the upper layer upper than the transport layer, transmits the information on the broadcasting station and the reception apparatus 20 can recognize the transmission source IP address and the transmission source port number from the information on the broadcasting station, the transmission source IP address included in the IP header and the transmission source port number included in the UDP header can be restored to the transmission source IP address and the transmission source port number, which are recognized from the information on the broadcasting station, respectively.

Note that, as described above, the restoration unit 22 actually calculates the checksums included in the IP header and the UDP header to restore the respective checksums. Therefore, the restored checksums are not substantially effective (do not function).

However, in the broadcast compliant with the broadcast standard such as the ATSC 3.0, the physical layer executes a strong error correction. Accordingly, even if the checksums included in the IP header and the UDP header are not substantially effective, this does not cause a problem.

FIG. 17 is a drawing illustrating items restored to the fixed values among the IP header items and examples of the fixed values.

The items restored to the fixed values among the IP header items are, for example, a version (Version), an IHL, a DSCP, an ECN, an Identification, a Flags, a Fragment Offset, a Time To Live, and a Protocol.

The version (Version) is, for example, restored to the fixed value 4, which expresses that the IP version is IPv4.

Note that, as described in FIG. 6, in the case where type information in the Generic packet expresses, for example, the arrangement of the IP packet in IPv4 in the Generic payload and the arrangement of the IP packet in IPv6, the version can be restored to anyone of the fixed value of 4, which expresses the IPv4, and the fixed value of 6, which expresses the IPv6 according to the type information.

Assuming that the Options is absent in the IP header, the IHL is restored to the fixed value of 5 that expresses the length of the IP header being 20 bytes.

When the IP packets are broadcasted using the Generic packet, the DSCP, the ECN, the Identification, the Flags, and the Fragment Offset are not especially required and therefore are restored to, for example, 0 as the predetermined fixed value.

Accommodating that the IP packet restored by the reception apparatus 20 is transmitted over a communications network such as a home network, the Time to Live is restored to, for example, 128, which is the fixed value at which the survival time of the IP packet can be secured to some extent.

The Protocol is restored to 17, which is the fixed value expressing the protocol included in the payload in the IP packet, namely, the UDP.

Note that, to restore the transmission source IP address and the transmission source port number to the fixed values, for example, 192.168.0.0 and 60000, which are shown in the index table in FIG. 8, can be employed as the respective fixed values. Note that, the fixed values of the transmission source IP address and the transmission source port number are not limited to 192.168.0.0 and 60000, respectively.

Figure 18:
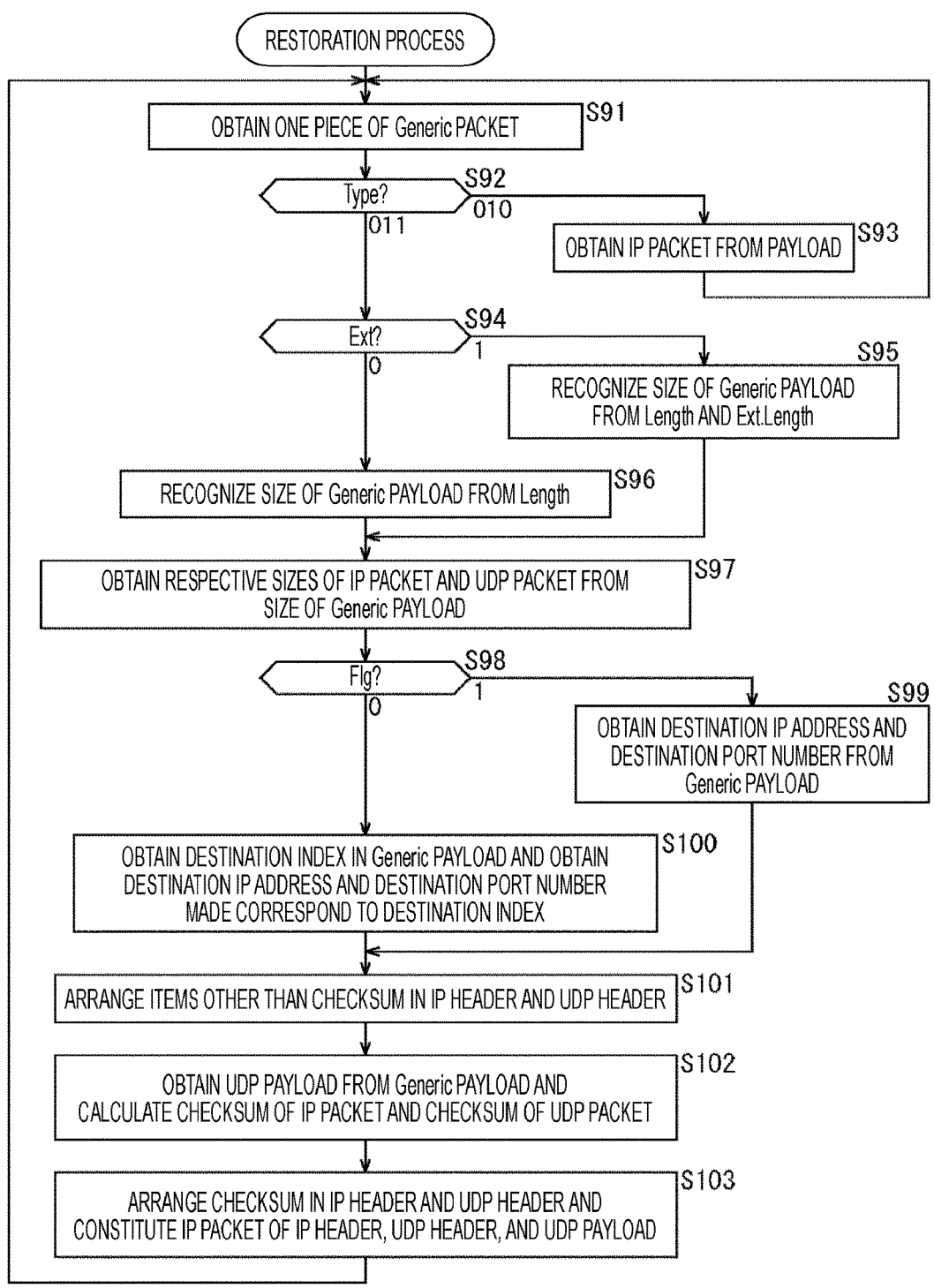
FIG. 18 is a flowchart describing an example of the restoration process of the IP packet.

FIG. 18 is a flowchart describing an example of the restoration process of the IP packet by the restoration unit 22.

At step S91, the restoration unit 22 waits for one piece of the Generic packet to be supplied from the reception unit 21 and obtains the Generic packet from the reception unit 21 as a restoration target Generic packet. The process proceeds to step S92.

At step S92, the restoration unit 22 determines the type information in the restoration target Generic packet.

At step S92, when the type information is determined as 010, that is, when the restoration target Generic packet is the Generic packet in the non-compressed mode (C of FIG. 7) and therefore the IP packet with the uncompressed IP header and UDP header (the IP packet with the proper IP header and UDP header) is arranged in the Generic payload, the process proceeds to step S93.

At step S93, the restoration unit 22 extracts (obtains) the IP packet with the uncompressed IP header and UDP header from the Generic payload and outputs the IP packet. The process returns to step S91.

Additionally, at step S92, when the type information is determined as 011, that is, the IP packet in IPv4 with the compressed IP header and UDP header is arranged in the Generic payload, the process proceeds to step S94.

At step S94, the restoration unit 22 determines the Ext in the restoration target Generic packet.

At step S94, when the Ext is determined as 1, that is, when the Generic header is the extended header, the process proceeds to step S95. At step S95, the restoration unit 22 recognizes a value expressed by a bit string where the length information (length) of the Generic header as the extended header is configured to be the lower bits and the length information for extension (Ext.Length) of the added byte is configured to be the upper bits as the length (length) of the Generic payload. The process proceeds to step S97.

Moreover, at step S94, when the Ext is determined as 0, that is, when the Generic header is the usual header, the process proceeds to step S96.

At step S96, the restoration unit 22 recognizes the value expressed by the length information in the Generic header, which is the usual header, as the length (length) of the Generic payload. The process proceeds to step S97.

At step S97, the restoration unit 22 restores the IP packet length and the UDP packet length (sizes) from the length of the Generic payload recognized at step S95 or S96 as described in FIG. 16 and arranges (includes) (sets) the respective packet lengths in the IP header and the UDP header. The process proceeds to step S98.

At step S98, the restoration unit 22 determines the Flg in the restoration target Generic packet.

At step S98, when the Flg is determined as 1, that is, when the restoration target Generic packet is the Generic packet in the compressed mode (B of FIG. 7) and the four-byte destination IP address and the two-byte destination port number are arranged at the head of the Generic payload immediately after the Generic header, the process proceeds to step S99.

At step S99, the restoration unit 22 obtains the destination IP address and the destination port number arranged at the head of the Generic payload to arrange the destination IP address and the destination port number to the IP header and the UDP header, respectively. The process proceeds to step S101.

Further, at step S98, when the Flg is determined as 0, that is, when the restoration target Generic packet is the Generic packet in the super compressed mode (A of FIG. 7) and the one-byte destination index is arranged at the head of the Generic payload immediately after the Generic header, the process proceeds to step S100.

At step S100, the restoration unit 22 obtains the destination index arranged at the head of the Generic payload. Furthermore, the restoration unit 22 recognizes the destination IP address and the destination port number made correspond to the destination index through searching from the index table (FIG. 8). Then, the restoration unit 22 arranges the destination IP address and the destination port number, which are made correspond to the destination index, in the respective IP header and UDP header. The process proceeds from step S100 to step S101.

At step S101, the restoration unit 22 arranges the predetermined fixed values described in, for example, FIG. 17 as the items other than the destination IP address, the IP packet length, and the checksum in the IP header.

Furthermore, the restoration unit 22 arranges the predetermined fixed value as the item other than the destination port number, the UDP packet length, and the checksum in the UDP header, that is, the transmission source port number.

Here, in addition to the use of the predetermined fixed values as the transmission source IP address in the IP header and the transmission source port number in the UDP header, as described above, in the case where the destination index is made correspond to the destination IP address and the destination port number and further the transmission source IP address and the transmission source port number in the index table, the transmission source IP address and the transmission source port number made correspond to the destination index can be used as the transmission source IP address for the IP header and the transmission source port number for the UDP header.

Additionally, in the case where the transmission apparatus 10, in the upper layer, transmits the information on the broadcasting station and the reception apparatus 20 can recognize the transmission source IP address and the transmission source port number from the information on the broadcasting station, as the transmission source IP address in the IP header and the transmission source port number in the UDP header, the transmission source IP address and the transmission source port number recognized from the information on the broadcasting station can be used. Note that, the transmission source IP address and the transmission source port number may be the fixed values as described above.

At step S101, after the items other than the checksums in the IP header and the UDP header are arranged as described above, the process proceeds to step S102. The restoration unit 22 obtains the actual data arranged in the Generic payload.

Then, the restoration unit 22 calculates the Checksum for IP using the IP header obtained up to the present and calculates the checksum for UDP using the UDP header and the actual data obtained up to the present. The process proceeds from step S102 to step S103.

At step S103, the restoration unit 22 arranges the checksum for IP in the IP header and arranges the checksum for UDP in the UDP header. Furthermore, the restoration unit 22 configures and outputs the IP packet in which the IP header, the UDP header, and the actual data are arranged in this order. The process returns from step S103 to step S91.

<Explanation on Computer to Which Present Technology is Applied>

Next, a sequence of the above-described processes by the creation unit 11 and the restoration unit 22 can be executed by hardware and can also be executed by software. To execute the sequence of processes by software, a program constituting the software is installed on the computer or the like.

Figure 19:
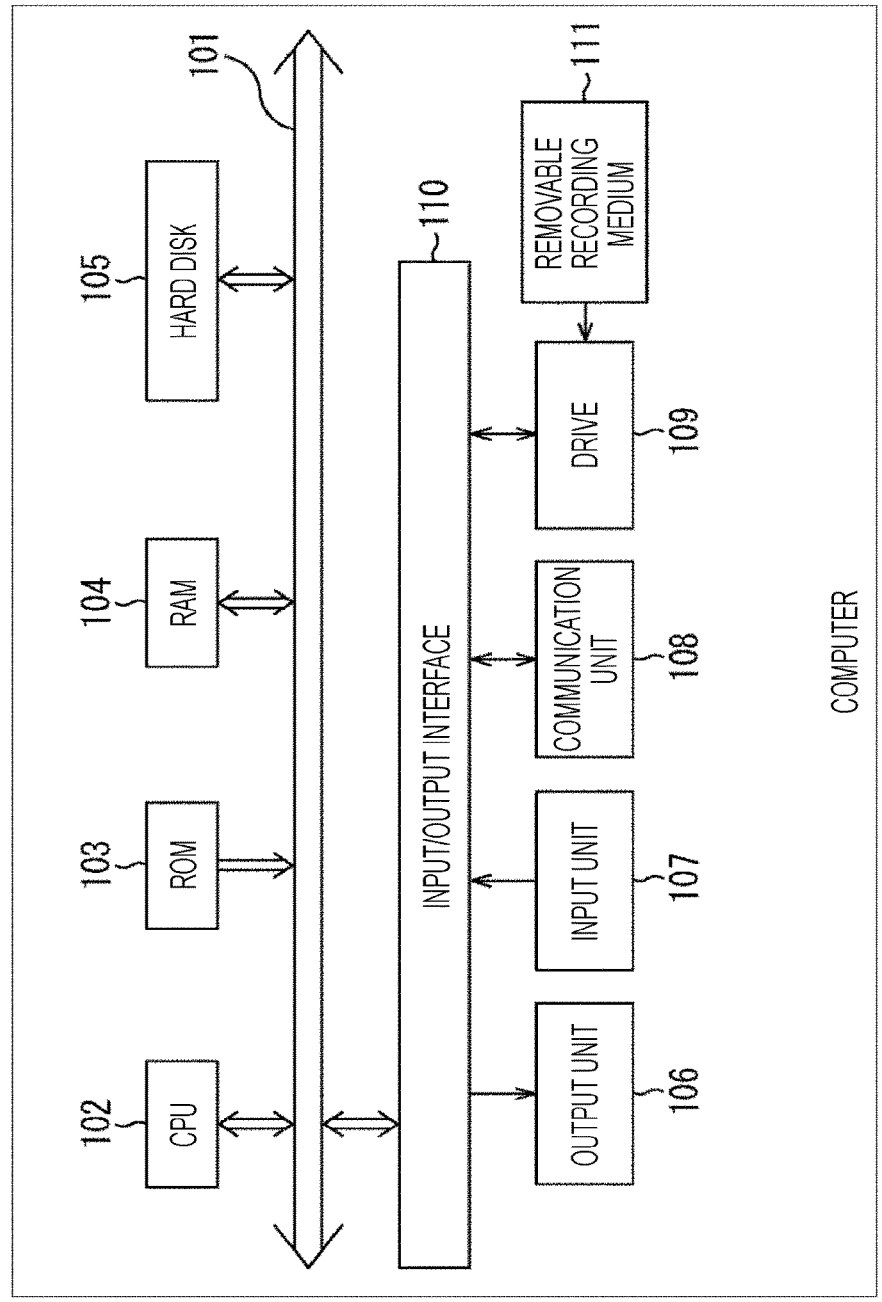
FIG. 19 is a block diagram illustrating an example of a configuration according to one embodiment of a computer to which the present technology is applied.

Then, FIG. 19 illustrates an example of the configuration according to one embodiment of the computer on which the program executing the above-described sequence of processes is installed.

A hard disk 105 and a ROM 103 as a recording medium built into the computer can preliminary record the program.

Alternatively, a removable recording medium 111 can store (record) the program. Such removable recording medium 111 can be provided as so-called package software. Here, as the removable recording medium 111, for example, a flexible disk, a Compact Disc Read Only Memory (CD-ROM), a Magneto Optical (MO) disk, a Digital Versatile Disc (DVD), a magnetic disk, a semiconductor memory, and the like are listed.

Note that, the program can be installed from the above-described removable recording medium 111 on the computer. Besides, the program can be downloaded into the computer via a communications network and a broadcast network to install the program into the built-in hard disk 105. That is, the program, for example, can be wirelessly transferred from a download website to the computer via an artificial satellite for digital satellite broadcasting or can be transferred to the computer over the wired network such as a Local Area Network (LAN) and the Internet.

The computer incorporates a Central Processing Unit (CPU) 102. An input/output interface 110 is coupled to the CPU 102 via a bus 101.

When a user inputs a command through an operation on an input unit 107 via the input/output interface 110 or the like, the CPU 102 follows the command and executes the program stored in the Read Only Memory (ROM) 103. Alternatively, the CPU 102 loads the program stored on the hard disk 105 on a Random Access Memory (RAM) 104 for execution.

In view of this, the CPU 102 executes the processes following the above-described flowcharts or the processes executed by the above-described configuration in the block diagram. Then, the CPU 102 outputs the process result, for example, from an output unit 106 via the input/output interface 110 as necessary. Alternatively, the CPU 102, for example, causes a communication unit 108 to transmit the process result and further causes the hard disk 105 to record the process result.

Note that, the input unit 107 is configured of a keyboard, a computer mouse, a microphone, and the like. Additionally, the output unit 106 is configured of a Liquid Crystal Display (LCD), a speaker, and the like.

Here, in this description, the processes executed by the computer following the program are not necessarily to be executed in time series in the order described as the flowcharts. That is, the processes executed by the computer following the program also include processes executed concurrently or individually (for example, a parallel process or a process with an object).

Additionally, the one computer (processor) may process the program or the plurality of computers may dispersively process the program.

Furthermore, in this description, the system means a collection of the plurality of structural elements (an apparatus, a module (component), and the like). It does not matter whether all structural elements are in the same casing. Accordingly, a plurality of apparatuses housed in different casings and are coupled over a network and one apparatus that houses a plurality of modules in one casing are all referred to as the system.

Note that, the embodiments of the present technology are not limited to the above-described embodiments. Various modifications can be made within a scope not departing from the gist of the present technology.

For example, the respective steps described in the above-described flowcharts can be executed by the one apparatus and also can be shared and executed by the plurality of apparatuses.

Furthermore, in the case where one step includes a plurality of processes, the plurality of processes included in the one step can be executed by the one apparatus and also can be shared and executed by the plurality of apparatuses.

Additionally, while obviously applicable to the ATSC, the present technology is also be applicable to broadcasting in the broadcast standard other than the ATSC, for example, the Digital Video Broadcasting (DVB) and the Integrated Services Digital Broadcasting (ISDB).

Additionally, the effects described in this description are merely examples and are not limited; therefore, another effect may be provided.

Note that, the present technology can employ the following configurations.

<1>

A transmission apparatus including:
  a creation unit configured to create a transmission packet, the transmission packet being constituted of:
    a header constituted of type information and length information, the type information expressing whether an Internet Protocol (IP) header and a User Datagram Protocol (UDP) header are compressed, the length information expressing a length of the transmission packet to transmit an IP packet including a UDP packet; and
a payload constituted of a destination index and a payload in the UDP packet, the destination index being made correspond to a destination IP address of the IP packet and a destination port number of the UDP packet; and
a transmission unit configured to transmit the transmission packet.

<2>
The transmission apparatus according to <1>,
wherein when the destination index made correspond to the destination IP address and the destination port number is present, the creation unit is configured to create the transmission packet of the payload constituted of the destination index and the payload in the UDP packet,
when the destination index made correspond to the destination IP address and the destination port number is absent, the creation unit is configured to create the transmission packet of a payload constituted of the destination IP address, the destination port number, and the payload in the UDP packet, and
the header of the transmission packet is constituted of the type information, the length information, and kind information, the kind information expressing whether any of the destination index, the destination IP address, and the destination port number is included in the payload in the transmission packet.

<3>
The transmission apparatus according to <1> or <2>,
wherein the destination index has a size less than a total size of the destination IP address and the destination port number.

<4>
A transmission method including steps of:
creating a transmission packet, the transmission packet being constituted of:
a header constituted of type information and length information, the type information expressing whether an Internet Protocol (IP) header and a User Datagram Protocol (UDP) header are compressed, the length information expressing a length of the transmission packet to transmit an IP packet including a UDP packet; and
a payload constituted of a destination index and a payload in the UDP packet, the destination index being made correspond to a destination IP address of the IP packet and a destination port number of the UDP packet; and
transmitting the transmission packet.

<5>
A reception apparatus including:
a reception unit configured to receive a transmission packet, the transmission packet being constituted of:
a header constituted of type information and length information, the type information expressing whether an Internet Protocol (IP) header and a User Datagram Protocol (UDP) header are compressed, the length information expressing a length of the transmission packet to transmit an IP packet including a UDP packet; and
a payload constituted of a destination index and a payload in the UDP packet, the destination index being made correspond to a destination IP address of the IP packet and a destination port number of the UDP packet; and
a restoration unit configured to restore the IP packet from the transmission packet.

<6>
The reception apparatus according to <5>,
wherein the restoration unit is configured to:
restore the destination IP address and the destination port number made correspond to the destination index as respectively a destination IP address included in the IP header and a destination port number included in the UDP header;
restore information on a length of the IP packet included in the IP header and information on a length of the UDP packet included in the UDP packet from the length information;
restore an item other than the destination IP address, the information on the length of the IP packet, and a checksum included in the IP header to a predetermined fixed value;
restore an item other than the destination port number, the information on the length of the UDP packet, and a checksum included in the UDP header to a predetermined fixed value; and
restore the respective checksums for the IP packet and the UDP packet through calculation.

<7>
The reception apparatus according to <5>,
wherein in addition to the destination IP address and the destination port number, a transmission source IP address and a transmission source port number are also made correspond to the destination index,
the restoration unit is configured to:
restore the destination IP address and the destination port number made correspond to the destination index as respectively a destination IP address included in the IP header and a destination port number included in the UDP header;
restore the transmission source IP address and the transmission source port number made correspond to the destination index as respectively a transmission source IP address included in the IP header and a transmission source port number included in the UDP header;
restore information on a length of the IP packet included in the IP header and information on a length of the UDP packet included in the UDP packet from the length information;
restore an item other than the destination IP address, the information on the length of the IP packet, the transmission source IP address, and a checksum included in the IP header to a predetermined fixed value; and
restore the checksum for the IP packet and a checksum for the UDP packet through calculation.

<8>
The reception apparatus according to any of <5> to <7>,
wherein the destination index has a size less than a total size of the destination IP address and the destination port number.

<9>
A reception method including steps of:
receiving a transmission packet, the transmission packet being constituted of:
a header constituted of type information and length information, the type information expressing whether an Internet Protocol (IP) header and a User Datagram Protocol (UDP) header are compressed, the length information expressing a length of the transmission packet to transmit an IP packet including a UDP packet; and
  a payload constituted of a destination index and a payload in the UDP packet, the destination index being made correspond to a destination IP address of the IP packet and a destination port number of the UDP packet; and
 restoring the IP packet from the transmission packet.

<10>

A transmission apparatus including:
a creation unit configured to create a transmission packet, the transmission packet being constituted of:
  a header constituted of type information and length information, the type information expressing whether an Internet Protocol (IP) header and a User Datagram Protocol (UDP) header are compressed, the length information expressing a length of the transmission packet to transmit an IP packet including a UDP packet; and
  a payload constituted of a destination IP address of the IP packet, a destination port number of the UDP packet, and a payload in the UDP packet; and
a transmission unit configured to transmit the transmission packet.

<11>

The transmission apparatus according to <10>,
wherein the payload in the transmission packet includes only the destination IP address and the destination port number in the IP header and the UDP header.

<12>

A transmission method including steps of:
creating a transmission packet, the transmission packet being constituted of:
  a header constituted of type information and length information, the type information expressing whether an Internet Protocol (IP) header and a User Datagram Protocol (UDP) header are compressed, the length information expressing a length of the transmission packet to transmit an IP packet including a UDP packet; and
  a payload constituted of a destination IP address of the IP packet, a destination port number of the UDP packet, and a payload in the UDP packet; and
transmitting the transmission packet.

<13>

A reception apparatus including:
a reception unit configured to receive a transmission packet, the transmission packet being constituted of:
  a header constituted of type information and length information, the type information expressing whether an Internet Protocol (IP) header and a User Datagram Protocol (UDP) header are compressed, the length information expressing a length of the transmission packet to transmit an IP packet including a UDP packet; and
  a payload constituted of a destination IP address of the IP packet, a destination port number of the UDP packet, and a payload in the UDP packet; and
a restoration unit configured to restore the IP packet from the transmission packet.

<14>

The reception apparatus according to <13>,
wherein the restoration unit is configured to:
  restore the destination IP address and the destination port number included in the header in the transmission packet as respectively a destination IP address included in the IP header and a destination port number included in the UDP header;
  restore information on a length of the IP packet included in the IP header and information on a length of the UDP packet included in the UDP packet from the length information;
  restore an item other than the destination IP address, the information on the length of the IP packet, and a checksum included in the IP header to a predetermined fixed value;
  restore an item other than the destination port number, the information on the length of the UDP packet, and a checksum included in the UDP header to a predetermined fixed value; and
  restore the respective checksums for the IP packet and the UDP packet through calculation.

<15>

The reception apparatus according to <13> for obtaining a transmission source IP address of the IP packet and a transmission source port number of the UDP packet in a layer upper than a transport layer,
wherein the restoration unit is configured to:
  restore the destination IP address and the destination port number included in a header in the transmission packet as respectively a destination IP address included in the IP header and a destination port number included in the UDP header;
  restore information on a length of the IP packet included in the IP header and information on a length of the UDP packet included in the UDP packet from the length information;
  restore the transmission source IP address and the transmission source port number obtained in the upper layer as respectively a transmission source IP address included in the IP header and a transmission source port number included in the UDP header;
  restore an item other than the destination IP address, the information on the length of the IP packet, the transmission source port number, and a checksum included in the IP header to a predetermined fixed value; and
  restore the respective checksums for the IP packet and the UDP packet through calculation.

<16>

A reception method including steps of:
receiving a transmission packet, the transmission packet being constituted of:
  a header constituted of type information and length information, the type information expressing whether an Internet Protocol (IP) header and a User Datagram Protocol (UDP) header are compressed, the length information expressing a length of the transmission packet to transmit an IP packet including a UDP packet; and
  a payload constituted of a destination IP address of the IP packet, a destination port number of the UDP packet, and a payload in the UDP packet; and
restoring the IP packet from the transmission packet.

REFERENCE SIGNS LIST

10 Transmission apparatus
11 Creation unit
12 Transmission unit

20 Reception apparatus
21 Reception unit
22 Restoration unit
101 Bus
102 CPU
103 ROM
104 RAM
105 Hard disk
106 Output unit
107 Input unit
108 Communication unit
109 Drive
110 Input/output interface
111 Removable recording medium

The invention claimed is:

1. A transmission apparatus comprising:
circuitry configured to
create a transmission packet, the transmission packet including
a header, the header including type information and length information, the type information indicating whether an Internet Protocol (IP) header and a User Datagram Protocol (UDP) header are compressed, the length information indicating a length of the transmission packet to transmit an IP packet including a UDP packet, and
a generic payload, the generic payload including a destination index and a payload in the UDP packet, the destination index being corresponding to a destination IP address of the IP packet and a destination port number of the UDP packet based on an index table stored in the transmission apparatus; and
transmit the transmission packet.

2. The transmission apparatus according to claim 1, wherein when the destination index corresponding to the destination IP address and the destination port number is present, the circuitry is further configured to create the transmission packet of the generic payload, the generic payload including the destination index and the payload in the UDP packet,
when the destination index corresponding to the destination IP address and the destination port number is absent, the circuitry is further configured to create the transmission packet of another generic payload, the other generic payload including the destination IP address, the destination port number, and the payload in the UDP packet, and
the header of the transmission packet includes the type information, the length information, and kind information, the kind information indicating whether any of the destination index, the destination IP address, and the destination port number is included in the payload in the generic transmission packet.

3. The transmission apparatus according to claim 1, wherein the destination index has a size less than a total size of the destination IP address and the destination port number.

4. A transmission method, comprising:
creating a transmission packet, the transmission packet including
a header, the header including type information and length information, the type information indicating whether an Internet Protocol (IP) header and a User Datagram Protocol (UDP) header are compressed, the length information indicating a length of the transmission packet to transmit an IP packet including a UDP packet, and
a generic payload, the generic payload including a destination index and a payload in the UDP packet, the destination index being corresponding to a destination IP address of the IP packet and a destination port number of the UDP packet based on an index table stored in a transmission apparatus; and
transmitting the transmission packet.

5. A reception apparatus, comprising:
circuitry configured to receive a transmission packet, the transmission packet including
a header, the header including type information and length information, the type information indicating whether an Internet Protocol (IP) header and a User Datagram Protocol (UDP) header are compressed, the length information indicating a length of the transmission packet to transmit an IP packet including a UDP packet, and
a generic payload, the generic payload including a destination index and a payload in the UDP packet, the destination index being corresponding to a destination IP address of the IP packet and a destination port number of the UDP packet based on an index table stored in the transmission reception apparatus; and
restore the IP packet from the transmission packet.

6. The reception apparatus according to claim 5, wherein the circuitry is configured to
restore the destination IP address and the destination port number that correspond to the destination index, the destination IP address being included in the IP header, the destination port number being included in the UDP header;
restore information on a length of the IP packet included in the IP header and information on a length of the UDP packet included in the UDP packet from the length information;
restore an item other than the destination IP address, the information on the length of the IP packet, and a checksum included in the IP header to a predetermined fixed value;
restore an item other than the destination port number, the information on the length of the UDP packet, and a checksum included in the UDP header to a predetermined fixed value; and
restore the respective checksums for the IP packet and the UDP packet through calculation.

7. The reception apparatus according to claim 5, wherein in addition to the destination IP address and the destination port number, a transmission source IP address and a transmission source port number also correspond to the destination index, and
the circuitry is further configured to
restore the destination IP address and the destination port number that correspond to the destination index, the destination IP address being included in the IP header, the destination port number being included in the UDP header;
restore the transmission source IP address and the transmission source port number that correspond to the destination index, the transmission source IP address being included in the IP header, the transmission source port number being included in the UDP header;
restore information on a length of the IP packet included in the IP header and information on a length of the UDP packet included in the UDP packet from the length information;

restore an item other than the destination IP address, the information on the length of the IP packet, the transmission source IP address, and a checksum included in the IP header to a predetermined fixed value; and restore the checksum for the IP packet and a checksum for the UDP packet through calculation.

8. The reception apparatus according to claim 5, wherein the destination index has a size less than a total size of the destination IP address and the destination port number.

9. A reception method, comprising:

receiving a transmission packet, the transmission packet including a header, the header including type information and length information, the type information indicating whether an Internet Protocol (IP) header and a User Datagram Protocol (UDP) header are compressed, the length information indicating a length of the transmission packet to transmit an IP packet including a UDP packet, and a generic payload, the generic payload including a destination index and a payload in the UDP packet, the destination index being corresponding to a destination IP address of the IP packet and a destination port number of the UDP packet based on an index table stored in the transmission a reception apparatus; and restoring the IP packet from the transmission packet.

10. The reception method according to claim 9, wherein the destination index has a size less than a total size of the destination IP address and the destination port number.

11. A transmission apparatus, comprising:

circuitry configured to create a transmission packet, the transmission packet including a header, the header including type information, length information, and kind information, the type information indicating whether an Internet Protocol (IP) header and a User Datagram Protocol (UDP) header are compressed, the length information indicating a length of the transmission packet to transmit an IP packet including a UDP packet, the kind information indicating whether a destination index corresponding to a destination IP address of the IP packet and a destination port number of the UDP packet based on an index table stored in the transmission apparatus is included in a generic payload; and the generic payload, the generic payload including the destination IP address of the IP packet, the destination port number of the UDP packet, and a payload in the UDP packet; and transmit the transmission packet.

12. The transmission apparatus according to claim 10, wherein the generic payload in the transmission packet includes only the destination IP address and the destination port number in the IP header and the UDP header, respectively.

13. A transmission method, comprising:

creating a transmission packet, the transmission packet including a header, the header including type information, length information, and kind information, the type information indicating whether an Internet Protocol (IP) header and a User Datagram Protocol (UDP) header are compressed, the length information indicating a length of the transmission packet to transmit an IP packet including a UDP packet, the kind information indicating whether a destination index corresponding to a destination IP address of the IP packet and a destination port number of the UDP packet based on an index table stored in a transmission apparatus is included in a generic payload, and the generic payload, the generic payload including the destination IP address of the IP packet, the destination port number of the UDP packet, and a payload in the UDP packet; and transmitting the transmission packet.

14. A reception apparatus, comprising:

circuitry configured to receive a transmission packet, the transmission packet including a header, the header including type information, length information, and kind information, the type information indicating whether an Internet Protocol (IP) header and a User Datagram Protocol (UDP) header are compressed, the length information indicating a length of the transmission packet to transmit an IP packet including a UDP packet, the kind information indicating whether a destination index corresponding to a destination IP address of the IP packet and a destination port number of the UDP packet based on an index table stored in the reception apparatus is included in a generic payload; and the generic payload, the generic payload including the destination IP address of the IP packet, the destination port number of the UDP packet, and a payload in the UDP packet; and restore the IP packet from the transmission packet.

15. The reception apparatus according to claim 14, wherein the circuitry is further configured to restore the destination IP address and the destination port number included in the header in the transmission packet, the destination IP address being included in the IP header, the destination port number being included in the UDP header;

restore information on a length of the IP packet included in the IP header and information on a length of the UDP packet included in the UDP packet from the length information;

restore an item other than the destination IP address, the information on the length of the IP packet, and a checksum included in the IP header to a predetermined fixed value;

restore an item other than the destination port number, the information on the length of the UDP packet, and a checksum included in the UDP header to a predetermined fixed value; and restore the respective checksums for the IP packet and the UDP packet through calculation.

16. The reception apparatus according to claim 14 for obtaining a transmission source IP address of the IP packet and a transmission source port number of the UDP packet in a layer upper than a transport layer, wherein the circuitry is further configured to restore the destination IP address and the destination port number included in a header in the transmission packet, the destination IP address being included in the IP header, the destination port number being included in the UDP header;

restore information on a length of the IP packet included in the IP header and information on a length of the UDP packet included in the UDP packet from the length information;

restore the transmission source IP address and the transmission source port number obtained in the upper layer, the transmission source IP address being included in the IP header, the transmission source port number being included in the UDP header;
restore an item other than the destination IP address, the information on the length of the IP packet, the transmission source port number, and a checksum included in the IP header to a predetermined fixed value; and
restore the respective checksums for the IP packet and the UDP packet through calculation.

17. A reception method, comprising:
receiving a transmission packet, the transmission packet including
a header, the header including type information, length information, and kind information, the type information indicating whether an Internet Protocol (IP) header and a User Datagram Protocol (UDP) header are compressed, the length information indicating a length of the transmission packet to transmit an IP packet including a UDP packet, the kind information indicating whether a destination index corresponding to a destination IP address of the IP packet and a destination port number of the UDP packet based on an index table stored in a reception apparatus is included in a generic payload, and
the generic payload, the generic payload including the destination IP address of the IP packet, the destination port number of the UDP packet, and a payload in the UDP packet; and
restoring the IP packet from the transmission packet.

* * * * *